US006556889B2

(12) United States Patent
Rudick et al.

(10) Patent No.: US 6,556,889 B2
(45) Date of Patent: Apr. 29, 2003

(54) VENDING MACHINE

(75) Inventors: Arthur G. Rudick, Atlanta, GA (US); Paul Carlson, Kennesaw, GA (US); Tom P. Howell, Suwanee, GA (US)

(73) Assignee: The Coca-Cola Company, Atlanta, GA (US)

( * ) Notice: Subject to any disclaimer, the term of this patent is extended or adjusted under 35 U.S.C. 154(b) by 0 days.

(21) Appl. No.: 09/740,905

(22) Filed: Dec. 21, 2000

(65) Prior Publication Data

US 2001/0000609 A1 May 3, 2001

Related U.S. Application Data

(62) Division of application No. 09/045,005, filed on Mar. 20, 1998, now Pat. No. 6,199,720.

(51) Int. Cl.[7] ................................................ G06F 17/00

(52) U.S. Cl. ....................... 700/244; 700/242; 700/232; 221/2; 221/4

(58) Field of Search ................................ 700/231, 232, 700/242, 244; 221/2, 4, 13, 123

(56) References Cited

U.S. PATENT DOCUMENTS

| | | | | |
|---|---|---|---|---|
| 2,093,410 A | | 9/1937 | Boon | |
| 2,440,251 A | | 4/1948 | Devens | |
| 2,615,773 A | | 10/1952 | Holt et al. | |
| 2,770,393 A | | 11/1956 | Gale | |
| 3,294,282 A | * | 12/1966 | Brown | 221/12 |
| 3,348,732 A | | 10/1967 | Schwarz | 221/123 |
| 3,722,744 A | | 3/1973 | Payne | |
| 3,752,357 A | | 8/1973 | Harris | 221/17 |
| 3,802,881 A | * | 4/1974 | Frederick | 221/123 |
| 3,810,560 A | | 5/1974 | Stegeman | |
| 3,990,754 A | | 11/1976 | Pitel et al. | 312/35 |
| 4,108,333 A | | 8/1978 | Falk et al. | |
| 4,252,250 A | | 2/1981 | Toth | |
| 4,303,179 A | | 12/1981 | Spring | |
| 4,319,742 A | | 3/1982 | Ulseth | |
| 4,483,459 A | | 11/1984 | Taylor et al. | |
| 4,511,059 A | | 4/1985 | Manzer | |
| 4,706,794 A | | 11/1987 | Awane et al. | |
| 4,717,044 A | | 1/1988 | Suzuki et al. | |
| 4,812,629 A | | 3/1989 | O'Neil et al. | |
| 4,815,055 A | | 3/1989 | Fago | 369/36 |
| 4,871,054 A | | 10/1989 | Murray | |
| 4,872,592 A | | 10/1989 | Anazawa | |
| 4,967,896 A | | 11/1990 | Hara | |
| 4,986,441 A | | 1/1991 | Kanbe et al. | |
| 4,991,739 A | | 2/1991 | Levasseur | |
| 5,105,978 A | * | 4/1992 | Trouteaud et al. | 221/150 |
| 5,111,962 A | | 5/1992 | Oden | |
| 5,240,139 A | | 8/1993 | Chirnomas | |
| 5,499,707 A | | 3/1996 | Steury | |
| 5,511,646 A | | 4/1996 | Maldanis et al. | |
| 5,555,965 A | | 9/1996 | Mishina | |
| 5,881,911 A | * | 3/1999 | Burdette et al. | 221/131 |
| 6,199,720 B1 | * | 3/2001 | Rudick et al. | 221/6 |
| 6,230,930 B1 | * | 5/2001 | Sorensen et al. | 221/131 |

* cited by examiner

*Primary Examiner*—Khoi H. Tran
(74) *Attorney, Agent, or Firm*—Finnegan, Henderson, Farabow, Garrett & Dunner, L.L.P.

(57) ABSTRACT

A vending machine is provided with a cabinet having a plurality of inclined, vertically spaced shelves. The shelves are able to selectively feed a beverage container to an elevator which is located adjacent an interior, right side wall of the cabinet of vending machine. A beverage container is dispensed by an escapement block of a shelf onto the elevator. The elevator vertically moves the beverage container, and then dispenses the beverage container to a delivery mechanism which gently lowers the beverage container to a delivery port which communicates with the exterior of the vending machine. The shelves in the cabinet are readily reconfigurable such that their vertical spacing within the cabinet can be easily altered. The escapement blocks of the shelves are mechanically activated to dispense a beverage container by an activation device on the elevator. Thus, electrical power and control signals for the individual shelves are not necessary.

20 Claims, 27 Drawing Sheets

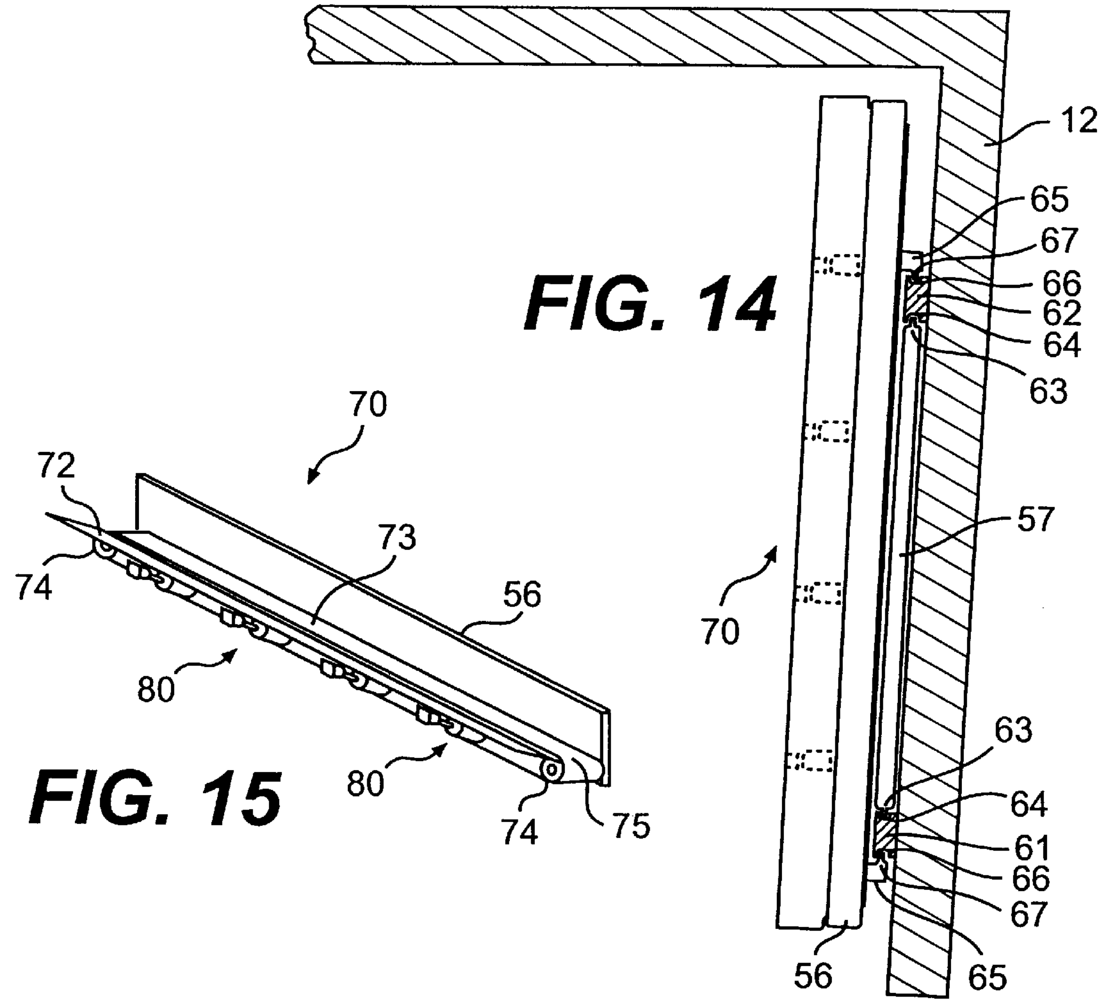
FIG. 14
FIG. 15
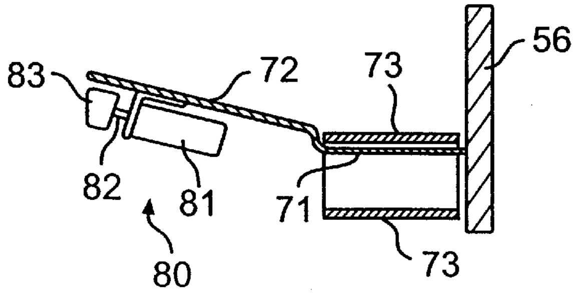
FIG. 16
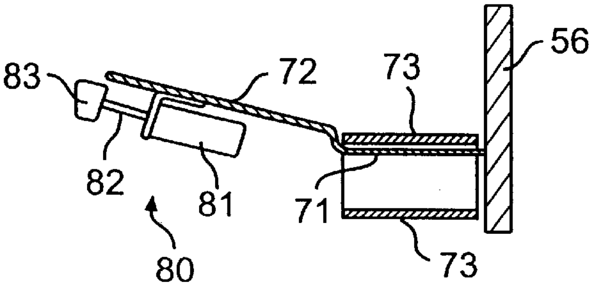
FIG. 17

VENDING MACHINE

This is a division of application Ser. No. 09/045,005, filed Mar. 20, 1998, now U.S. Pat. No. 6,199,720 which is incorporated herein by reference.

BACKGROUND OF THE INVENTION

1. Field of the Invention

The present invention relates to a vending machine for vending articles, most notably beverage containers. More particularly, the present invention relates to a vending machine having a cabinet with a plurality of vertically spaced shelves, and an elevator for receiving a packaged beverage from a shelf and for delivering the packaged beverage to a deliver port in a front face of the cabinet.

2. Description of the Relevant Art

Various vending machines are known which dispense articles from shelves or storage bins. Conventionally, the dispensed articles fall, under the influence of gravity, away from the shelf or storage bin. A chute is typically located in the path of the falling article and directs the falling article to a discharge port located beneath the shelves or storage bins.

Such conventional vending machines do not fully utilize the interior space of the vending machine. Since gravity is used to deliver the article to the discharge port, all of the shelves or storage bins must be located above the discharge port. The space adjacent and beneath the discharge port cannot be used to store vendable articles. Therefore, the discharge port is typically located in the lower portion of the vending machine. Having the discharge port located in the lower portion of the vending machine creates an inconvenience to customers, since the customers must bend over to pick up the vended article.

Some vending machines have been designed to avoid these problems. For example, one type provides an elevator within a vending machine. The elevator delivers articles from storage areas to a discharge port which is located at a convenient height. However, this vending machine cannot be easily adjusted to vend different size products, and the shelves of the vending machine are hard to load, especially the upper shelves. Further this vending machine is relatively complicated, expensive to manufacture and requires frequent maintenance.

Accordingly, a need exists in the art for a vending machine which can more fully utilize the space inside the vending machine for storing vendable articles. The vending machine must deliver the vended articles to a discharge port located at a convenient height. The vending machine must be easily modifiable, so that the vending machine owner can choose to vend articles of various sizes. The vending machine must have an article storage system that allows articles to be easily loaded into any storage area of the vending machine. Further, the vending machine must be simple in design, inexpensive to manufacture, and reliable in operation.

SUMMARY OF THE INVENTION

Accordingly, it is a primary object of the present invention to provide a vending machine which will more fully utilize the interior space of the vending machine, and which will vend articles, particularly beverage containers, to a discharge port located at an elevated height convenient to customers.

Another object of the present invention is to provide a vending machine in which the vertical spacing between shelves within the machine can be readily adjusted, such that different size beverage containers can be accommodated on the shelves.

Yet another object of the present invention is to easy to load, such that even a top shelf of a tall vending machine (typically seventy-nine inches tall) could be loaded by an average service person without the assistance of a step stool.

It is a further object of the present invention to provide a vending machine which is simple in design, inexpensive to manufacture, and reliable in operation.

It is yet a further object of the present invention to provide a vending machine which can gently move a vended package from a storage position on a shelf to a delivery port without damaging or agitating the vended package.

These and other objects of the present invention are fulfilled by providing a vending machine comprising a cabinet; at least one support bracket fixed within said cabinet; a shelf slidingly interacting with said at least one support bracket, so that said shelf may be horizontally slid between a first position and a second position; and an auxiliary support which supports said shelf in a tilted position, when said shelf is in said second position.

These and other objects of the present invention are also fulfilled by providing a vending machine comprising: cabinet; a plurality of support brackets fixed within said cabinet; a plurality of shelves, said plurality of shelves being vertically spaced within said cabinet, each shelf of said plurality of shelves being slidingly interactive with at least one support bracket of said plurality of support brackets, so that each shelf may be horizontally slid between a first position and a second position, wherein said plurality of support brackets are adjustably fixed within said cabinet, so that the vertical spacings between said plurality of shelves can be independently adjusted.

These and other objects of the present invention are further fulfilled by providing a method of servicing a vending machine comprising the steps of: providing a vending machine having a cabinet and a plurality of vertically spaced shelves therein; grasping one shelf of the plurality of the shelves; sliding the one shelf horizontally outward of the cabinet; and tilting the one shelf downward at an angle relative to horizontal.

Furthermore, these and other objects of the present invention are fulfilled by providing a method of servicing a vending machine comprising the steps of: providing a vending machine having a cabinet, a plurality of support brackets within the cabinet, and a plurality of vertically spaced shelves supported by the plurality of support brackets; grasping one shelf of the plurality of the shelves; sliding the one shelf horizontally outward of the cabinet; removing the one shelf from the cabinet; vertically moving the support brackets which supported the removed, one shelf; and inserting the one shelf back into the cabinet.

Furthermore, these and other objects of the present invention are also fulfilled by providing a vending machine comprising: a cabinet; a plurality of shelves vertically spaced within said cabinet; an elevator shaft disposed adjacent said plurality of shelves; a elevator arranged to move vertically within said elevator shaft; guide bars attached to said cabinet, said elevator being guided by said guide bars; and a counterweight attached to said elevator, said counterweight also being guided by said guide bars.

Furthermore, these and other objects of the present invention are further fulfilled by providing a vending machine comprising: a cabinet; a plurality of shelves vertically spaced within said cabinet; a elevator arranged to move vertically within said cabinet; and at least one solenoid attached to said elevator, said at least one solenoid being capable of physically interacting with respective portions of said plurality of shelves.

Moreover, these and other objects of the present invention are fulfilled by providing a method of operation for a vending machine comprising the steps of: providing a vending machine having a cabinet, a plurality of shelves vertically spaced within the cabinet, items disposed on the plurality of shelves, an elevator shaft adjacent the plurality of shelves, and an elevator vertically moveable in the elevator shaft, and at least one actuator attached to the elevator; vertically moving the elevator to a position near one shelf of said plurality of shelves; actuating the at least one actuator; moving the elevator in the area near the one shelf; interacting the at least one actuator with a portion of the one shelf, as the elevator moves adjacent the one shelf; and dispensing an item from the one shelf onto the elevator.

Moreover, these and other objects of the present invention are also fulfilled by providing a vending machine comprising: a cabinet; a plurality of shelves vertically spaced within said cabinet; an elevator-shaft disposed adjacent said plurality of shelves; an elevator vertically moveable in said elevator shaft; and a sensor disposed on said elevator for sensing indicators.

Moreover, these and other objects of the present invention are further fulfilled by providing a vending machine comprising: a cabinet; a plurality of shelves vertically spaced within said cabinet; an elevator shaft disposed adjacent said plurality of shelves; an elevator vertically moveable in said elevator shaft; a first sensor disposed on said elevator for sensing first indicators along said elevator shaft; a second sensor disposed on said elevator for sensing a second indicator attached to one shelf of said plurality of shelves.

These and other objects of the present invention are fulfilled by providing a method of operating a vending machine comprising the steps of: providing a vending machine with a cabinet, a plurality of shelves vertically spaced within the cabinet, an elevator shaft adjacent the plurality of shelves, an elevator vertically moveable in the elevator shaft, and a delivery port located along the elevator shaft which communicates to an exterior of the vending machine; locating the elevator near a top of the elevator shaft; accepting payment from a customer of the vending machine; upon accepting payment, moving the elevator to near a midpoint of the elevator shaft; accepting an item selection from the customer of the vending machine; upon accepting the selection, moving the elevator to a shelf containing the selected item; dispensing the selected item onto the elevator; moving the elevator to the delivery port; and dispensing the selected item from the elevator to the delivery port.

These and other objects of the present invention are also fulfilled by providing a method of initializing a vending machine, comprising the steps of: providing a vending machine having a plurality of shelves, an elevator shaft, an elevator vertically moveable in the elevator shaft, a sensor attached to the elevator, and a controller in communication with the sensor; loading items onto the plurality of shelves; programming the controller; passing the elevator along an extent of the elevator shaft; sensing the shelves using the sensor; communicating sensed parameters from the sensor to the controller; and processing the parameters in the controller.

These and other objects of the present invention are further fulfilled by providing an escapement mechanism for a vending machine, said escapement mechanism comprising: a main body; a slide mounted to said main body and capable of reciprocating between a first position and a second position; an actuation extension rotatably mounted to said main body, said actuation extension including a protrusion engaging said slide, wherein said protrusion causes said slide to move relative to said main body when said actuation extension is rotated; and a first gate rotatably mounted to said main body, said first gate including a portion engaging said slide, wherein said portion locks movement of said first gate when said slide is in said first position and allows movement of said first gate when said slide is in said second position.

Furthermore, these and other objects of the present invention are fulfilled by providing a method of modifying an escapement mechanism of a vending machine, said method comprising the steps of: providing a main body, a slide reciprocally mounted to the main body, an actuation extension rotatably mounted to the main body, a first gate rotatably mounted to the main body, and a second gate rotatably mounted to the main body; providing a first guide hole and a second guide hole in the main body, and a guide pin disposed in the first guide hole which serves as an axis of rotation for the second gate; removing the guide pin from the first guide hole; moving the second gate; and inserting the guide pin in the second guide hole, the guide pin again providing the axis of rotation for the second gate.

Furthermore, these and other objects of the present invention are also fulfilled by providing a method of operating an escapement mechanism of a vending machine, said method comprising the steps of providing a main body; a slide reciprocally mounted to said main body; an actuation extension rotatably mounted to said main body, said actuation extension including a protrusion for engaging said slide; and a first gate rotatably mounted to said main body, said first gate including a portion for engaging said slide; providing an elevator having an actuator attached thereto; locating the elevator near the main body; moving the elevator past the main body; contacting the actuator of the elevator with the actuation extension; rotating the actuation extension relative to the main body; contacting the protrusion of the actuation extension against the slide; moving the slide from a first position to a second position; releasing an engagement between the portion of the first gate and the slide; and rotating the first gate relative to the main body.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 14 is a cross sectional view taken along line 14—14 of FIG. 13A;

FIG. 15 is a left side perspective view of an elevator carrying platform;

FIG. 16 is a cross sectional view of the elevator carrying platform illustrating a solenoid actuator mechanism in an inactive state;

FIG. 17 is a cross sectional view of the elevator carrying platform illustrating the solenoid actuator mechanism in an active state;

DETAILED DESCRIPTION OF THE PREFERRED EMBODIMENTS

Figure 1:
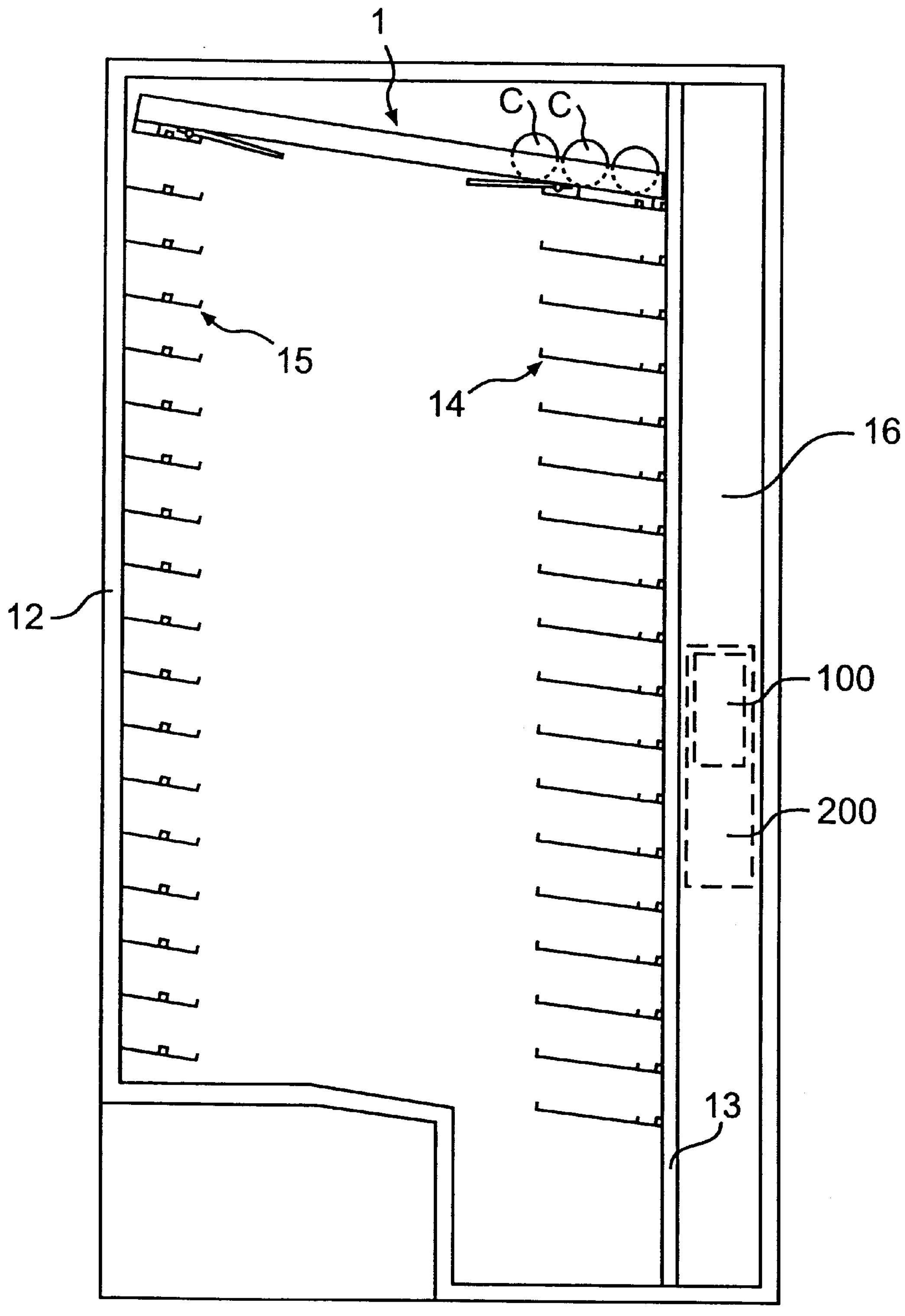
FIG. 1 is a front view of an interior of a cabinet of a vending machine of the present invention.

Referring in detail to the drawings and with particular reference to FIG. 1, a front view depicting an interior of a vending machine of the present invention is shown. The vending machine has its front doors, display portions, and payment accepting devices removed to simplify the illustration. The interior of the vending machine is defined by an insulated cabinet 12 which contains a plurality of left racks 15 and a plurality of right racks 14 for holding a plurality of shelf assemblies 1 thereon.

Each left rack 15 is slightly elevated in relation to an associated right rack 14, so that each shelf assembly 1 placed on each rack pair will slant slightly toward the right. Beverage containers C are stored on the shelf assemblies 1. The beverages containers C tend to roll or slide to the right due to the influence of gravity. It should be noted that the arrangement of FIG. 1 could be reversed so that the shelves would slant slightly toward the left.

Along the right side wall of the cabinet 12 is an elevator shaft 16. The elevator shaft 16 is defined between the right side wall of the cabinet 12 and a support column 13 spaced from the right side wall. A delivery mechanism 200 (illustrated by dashed lines) is connected to a backside of the vending machine door. The delivery mechanism 200 includes a delivery port 100 (illustrated by dashed lines), which communicates through the vending machine door. As will be described in greater detail later, a beverage container C is delivered from a shelf assembly 1 to an elevator carrying platform 70 (see FIG. 15) which travels along the elevator shaft 16 and delivers the beverage container C to the delivery mechanism 200.

Figure 2:
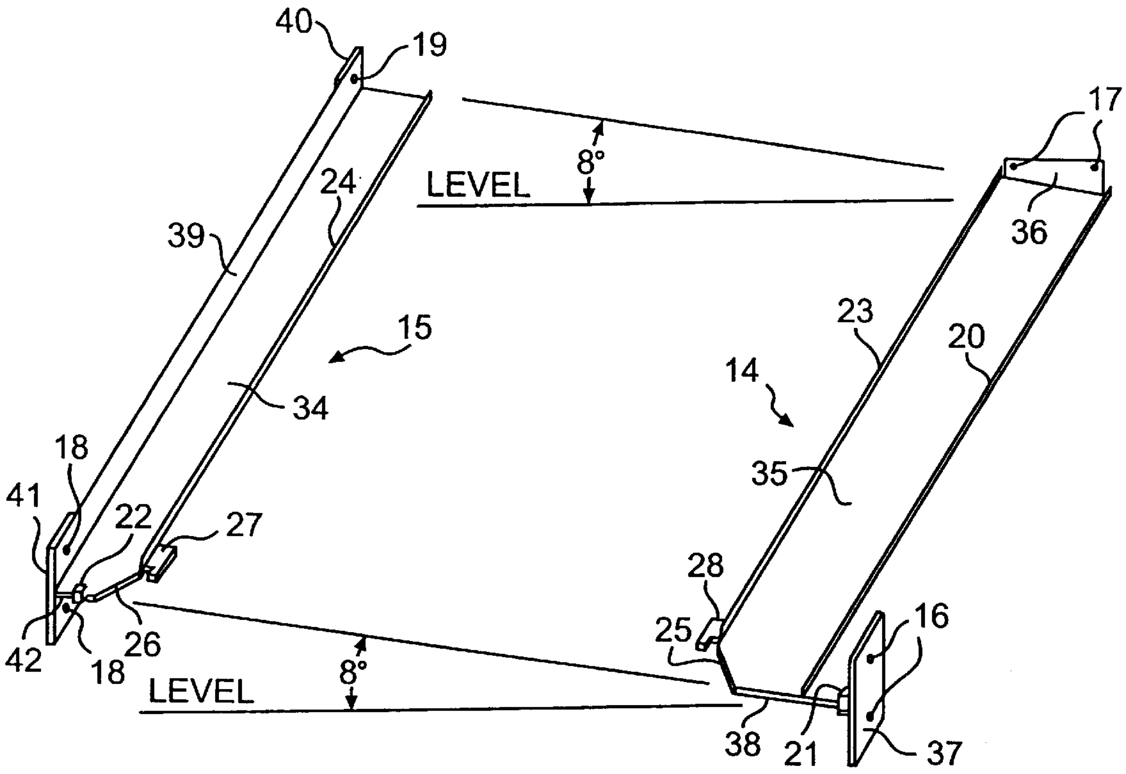
FIG. 2 is a right side perspective view of a pair of racks removed from the cabinet.

FIG. 2 illustrates a pair of racks 15, 14, removed from the cabinet 12. The left rack 15 is elevated relative to the right rack 14, so that a shelf assembly 1 supported on the pair of racks 15, 14 will be angled approximately eight degrees relative to horizontal.

The right rack 14 includes a generally planar surface 35. The planar surface 35 is bordered by a left raised edge 23 and a right raised edge 20. A rear mounting bracket 36 is provided for connecting the right rack 14 to an interior rear wall of the cabinet 12. A front bracket 37 is provided for connecting the right rack 14 to the support column 13.

A right hook 21 is located on the front mounting bracket 37 adjacent the support column 13. The left raised edge 23 stops short of a front edge 38 of the planar surface 35. As best seen in FIG. 2, from the end of the left raised edge 23 to the front edge 38 is an angled surface 25. The angled surface 25 is angled approximately forty five degrees relative to the left raised edge 23, and angled approximately forty five degrees relative to the front edge 38. A right projection 28 is located adjacent the intersection of the left raised edge 23 and the angled surface 25.

The front mounting bracket 37 of the right rack 14 includes mounting holes 16. Appropriate mounting devices, such as screws or bolts, connect the front mounting bracket 37 to the support column 13. The rear mounting bracket 36 also includes mounting holes 17. Again, appropriate mounting devices, such as screws or bolts, connect the rear mounting bracket 36 to the interior rear wall of the cabinet 12.

As an alternative to screws or bolts for mounting the front and rear mounting brackets 37 and 36, the interior rear wall may include two columns of mounting hooks which are horizontally spaced apart a distance equal to the spacing between the mounting holes 17 of the rear mounting bracket 17. Further, the support column 13 may include a single column of mounting hooks which are vertically spaced apart a distance equal to the spacing between the mounting holes 16 of the front mounting bracket 37. To attach the front and rear mounting brackets 37 and 36 to the cabinet 12, the mounting holes 16 and 17 are hooked over the mounting hooks of the support column 13 and the interior rear wall of the cabinet 12, respectively.

By the above described mounting arrangement, the right rack 14 may be quickly and easily vertically adjusted inside the cabinet 12 of the vending machine. Vertical adjustment allows the vending machine to be set up, or modified, to vend items of various sizes. For example, several shelf assemblies 1 may be closely vertically spaced and vend twelve ounce cans, while a few other shelf assemblies 1 may have relatively greater vertical spacing and vend two liter, plastic containers.

The left rack 15 is somewhat similar in structure to the right rack 14. The left rack 15 includes a generally planar surface 34. The planar surface 34 is bordered by a left raised edge 39 and a right raised edge 24. A rear mounting bracket 40 is provided for connecting the left rack 15 to a left interior sidewall of the cabinet 12. A front bracket 41 is provided for connecting the left rack 15 to the left interior sidewall.

A left hook 22 is located in a middle section of a front edge 42 of the planar surface 34. The right raised edge 24 stops short of the front edge 42 of the planar surface 34. As best seen in FIG. 2, from the end of the right raised edge 24 to the front edge 42 is an angled surface 26. The angled surface 26 is angled approximately forty five degrees relative to the right raised edge 24, and angled approximately forty five degrees relative to the front edge 42. A left projection 27 is located adjacent the intersection of the right raised edge 24 and the angled surface 26.

The rear mounting bracket 40 of the left rack 15 includes mounting holes 19, and the front mounting bracket 41 includes mounting holes 18. Again, appropriate mounting devices such as screws or bolts, or a mounting hook arrangement, can be employed to adjustably connect the rear mounting bracket 40 and the front mounting bracket 41 to the left interior sidewall of the cabinet 12.

Figure 3A:
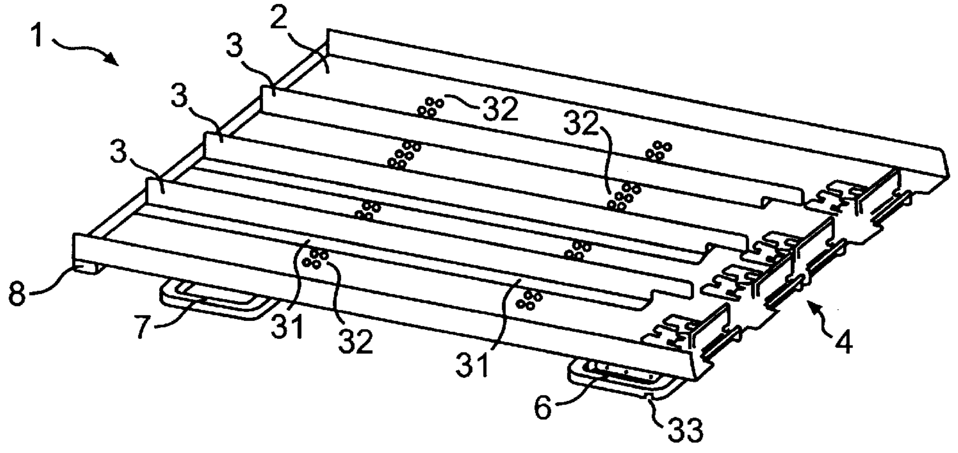
FIG. 3A is a right side perspective view of a shelf assembly.
Figure 4:
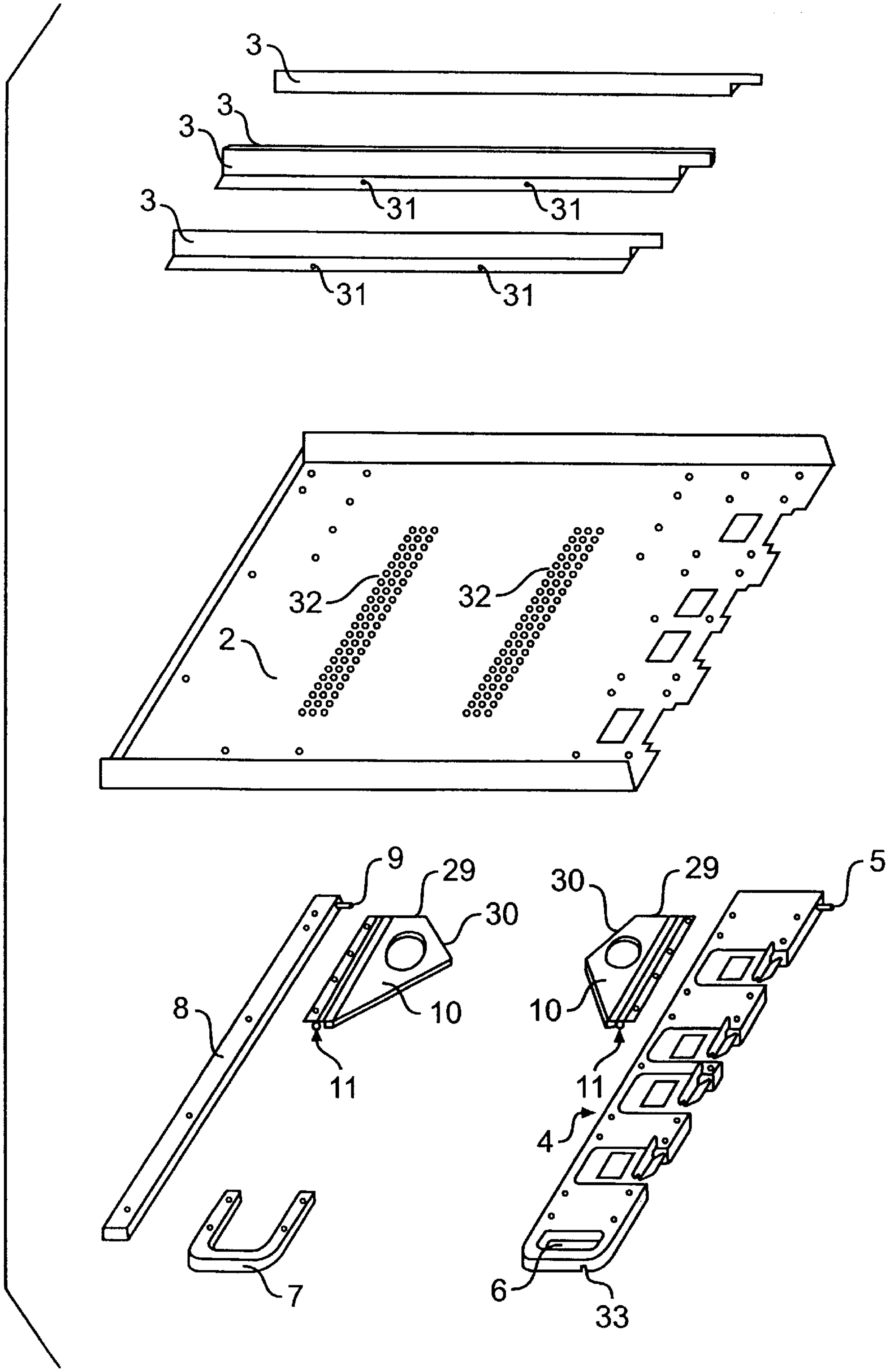
FIG. 4 is an exploded view of the shelf assembly illustrated in FIG. 3A.

FIGS. 3A and 4 illustrates the shelf assembly 1. The main component of the shelf assembly 1 is a shelf pan 2. The shelf pan 2 could be made out of sheet metal, molded out of plastic, or formed using other suitable materials and methods.

Dividers 3 are adjustably attached to a top surface of the shelf pan 2 by selectively aligning mounting holes 31 on side tabs of the dividers with adjustment holes 32 located in the shelf pan 2. Fixing devices, such as screws, rivets, bolt and nut arrangements, or mounting hooks are passed through the aligned holes to secure the dividers 3 to the shelf pan 2.

Since the dividers 3 are adjustable, the shelf assembly 1 can easily be modified to accommodate various sizes of beverage packages thereon. The shelf assembly 1 can accommodate containers laid on their sides, in rows two, three, or four deep on the shelf pan 2 depending on the heights of the containers.

Figure 3B:
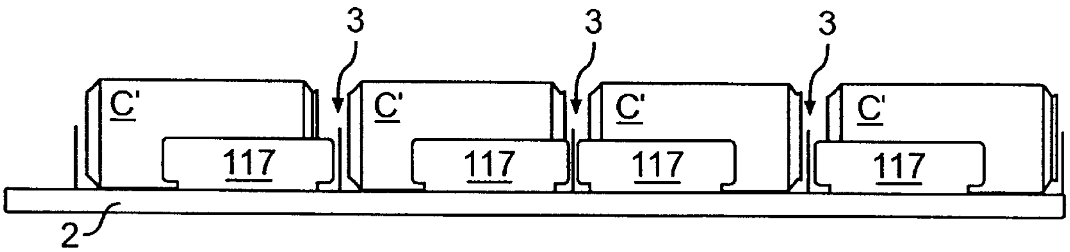
FIG. 3B is right side view of the shelf assembly with dividers arranged to accommodate four rows of beverage containers.

For example, FIG. 3B illustrates the shelf assembly 1 with four rows of beverage containers C' having similar heights. The beverage containers C' are twelve ounce cans, and the dividers 3 are equally spaced apart. When four rows are accommodated on the shelf assembly 1, the first beverage container C' of each row is held and dispensed by a respective first gate 117 (as will be fully disclosed below in relation to FIGS. 21–34).

Figure 3C:
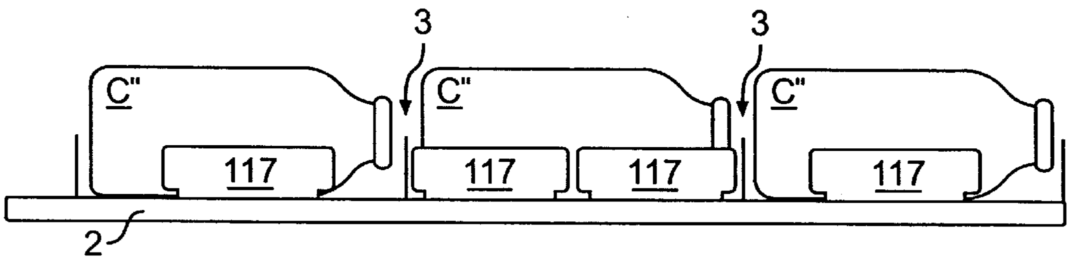
FIG. 3C is right side view of the shelf assembly with the dividers arranged to accommodate three rows of beverage containers.

As illustrated in FIG. 3C, the spacing between the dividers 3 can be modified, so that the shelf assembly 1 can accommodate three rows of taller, beverage containers C". When three rows are accommodated on the shelf assembly 1, the forwardmost row is held and dispensed by the forwardmost first gate 117; the middle row is held and dispensed by the middle two first gates 117; and the rearmost row is held and dispensed by the rearmost first gate 117.

Figure 3D:
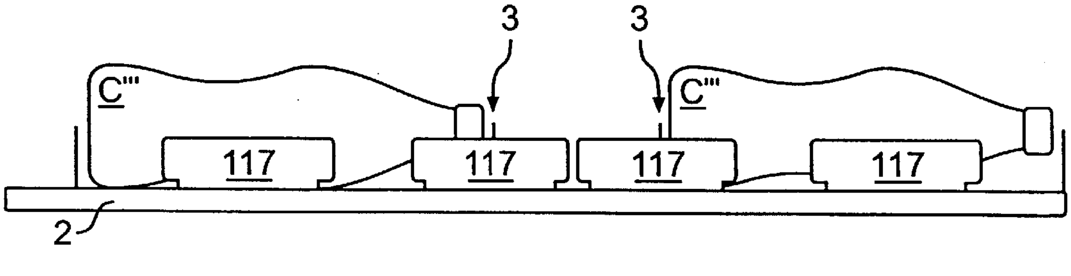
FIG. 3D is right side view of the shelf assembly with the dividers arranged to accommodate two rows of beverage containers.

As illustrated in FIG. 3D, the spacing between the dividers 3 can be modified, so that the shelf assembly 1 can accommodate two rows of even taller, beverage containers C'". When two rows are accommodated on the shelf assembly 1, the forwardmost row is held and dispensed by the two forwardmost first gates 117; and the rearmost row is held and dispensed by the two rearmost first gates 117.

As is evident from FIGS. 3B–3D, the adjustable divider arrangement of the present invention allows for a multitude of various vending combinations. The vending machine can have certain shelf assemblies set up to exclusively dispense a given size of beverage container. For example, one shelf assembly dispenses only twelve ounce cans, another shelf assembly dispenses only one liter bottles, while another shelf assembly dispenses only 16 ounce cans, etc.

It is preferred that each beverage container on a given shelf assembly 1 have substantially the same diameter. Therefore, no space inside the vending machine is wasted between adjacent shelf assemblies 1. Under this criteria, it would also be possible to vend beverage containers having different heights from the same shelf assembly, so long as their diameters were substantially equal. For example, one shelf assembly 1 could dispenses twelve ounce cans and sixteen ounce cans.

Instead of having the dividers 3 removably attached to the shelf pan 2, the dividers 3 may be permanently attached to the shelf pan 2. In such an arrangement, the dividers 3 may be integrally formed with the shelf pan 2, welded thereto, or attached by other permanent or semi-permanent means. When the dividers are fixed to the shelf pan 2, shelf assemblies 1, having varied divider layouts, would be available to vending machine service personnel. The service personnel would select the shelf assemblies 1 having divider layouts appropriate for the containers to be vended. The chosen shelf assemblies would be installed into the vending machine, rather than moving the dividers 3 of each shelf assembly in the vending machine.

Attached to an underside of the shelf pan 2 is an escapement block assembly 4 (the dispensing aspects of which will be fully described later). The escapement block assembly 4 includes a first handle 6 integrally formed at a front end, and a first pivot pin 5 formed at a back end. A guide slot 33 runs along an under surface of the escapement block assembly 4 from the front end to the back end.

Also attached to the underside of the shelf pan 2 is a second handle 7 and a slide bar 8. A back end of the slide bar 8 includes a second pivot pin 9. Two angle brackets 10 are attached to the underside of the shelf pan 2 via hinges 11. Each of the angle bracket 10 includes a first edge 29 and an angled edge 30. Each angle bracket 10 can be rotated about its hinge 11 so that the first edge 29 is perpendicular to the shelf pan 2.

Figure 5:
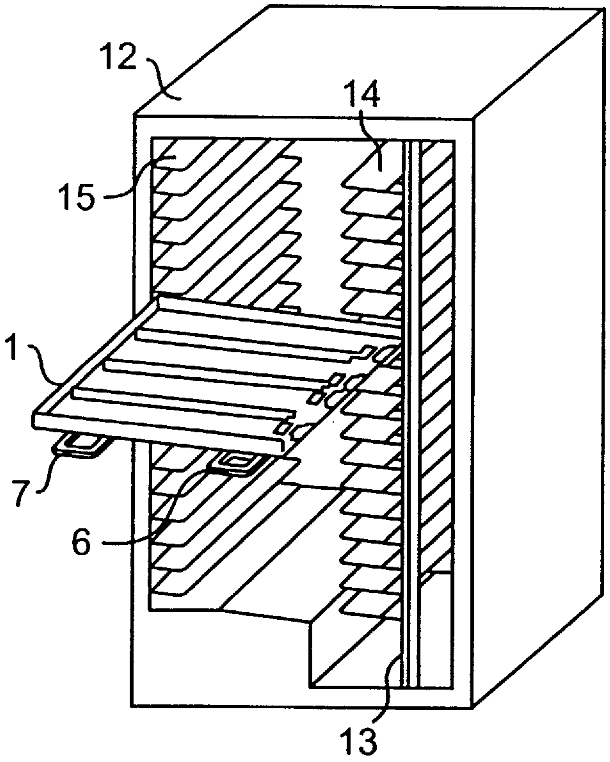
FIG. 5 is a right side perspective view of the vending machine with the shelf assembly horizontally drawn out of the cabinet.
Figure 6:
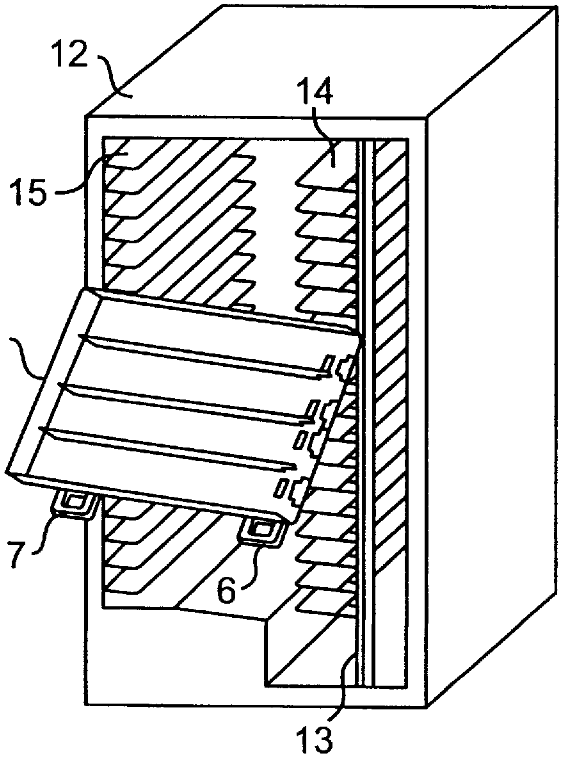
FIG. 6 is a right side perspective view of the vending machine with the shelf assembly in a tilted position.

FIGS. 5 and 6 illustrate accessing the shelf assembly 1. The shelf assembly 1 would be accessed to load the shelf assembly, to clear jams, to inventory the vend articles, or to perform similar operations. To slide the shelf assembly 1 out of the cabinet 12, a service person grasps the two handle 6 and 7 and pulls. FIG. 5 illustrates the shelf assembly pulled out horizontally to its full extent. At this point, the service person would still be supporting the weight of the shelf assembly 1 via the handles 6 and 7. FIG. 6 illustrates the shelf assembly 1 in a tilted position. The shelf assembly 1, under the influence of gravity, naturally takes this position as the service person allows the shelf assembly to lower using the grips 6 and 7.

Figure 7:
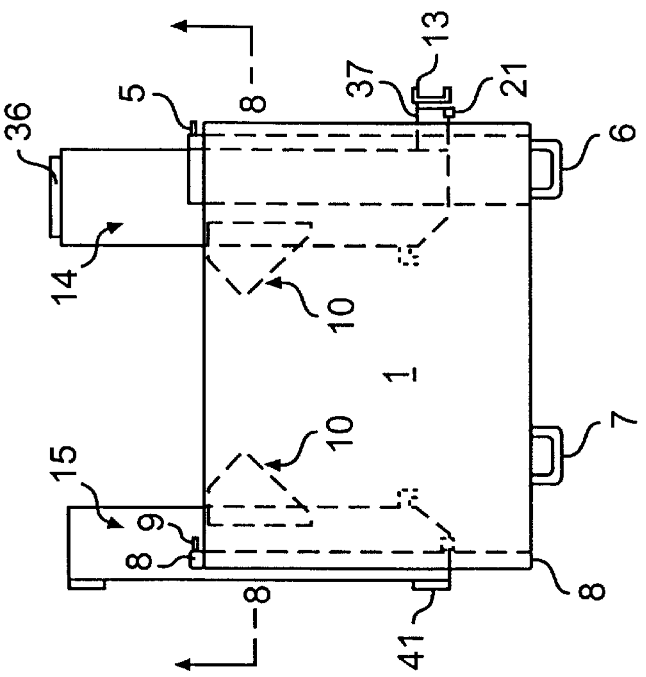
FIG. 7 is a top view of the racks and shelf assembly when the shelf assembly is partially withdrawn from the interior of the cabinet.
Figure 8:
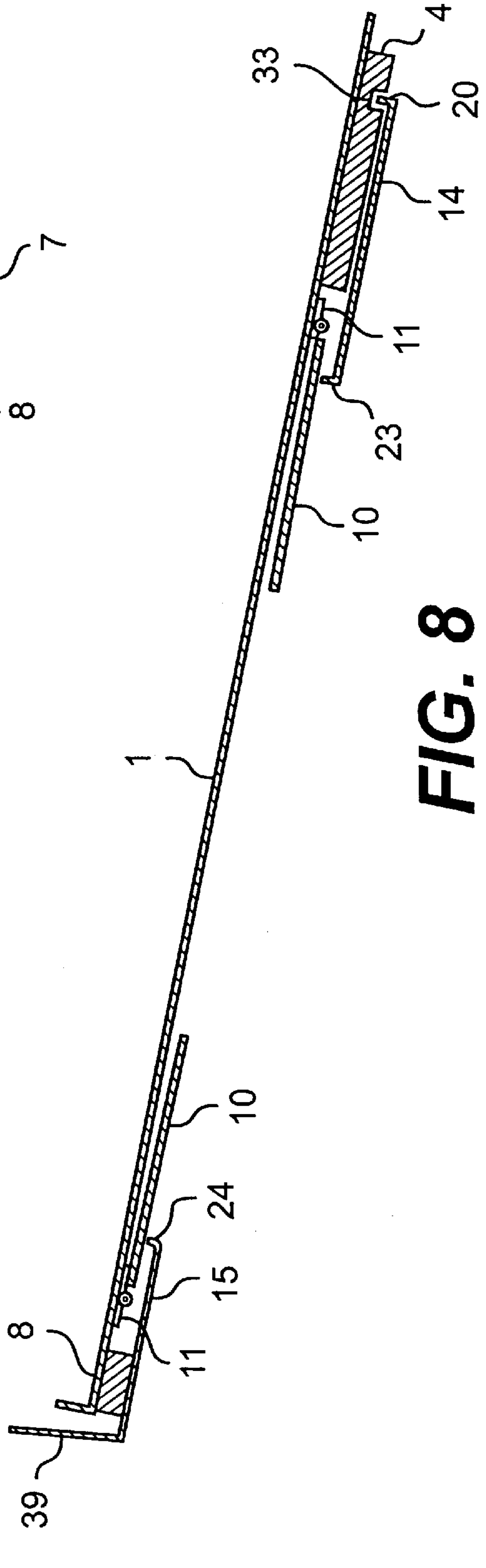
FIG. 8 is a cross sectional view taken along line 8—8 of FIG. 7.

Now, the interactions between the racks 14, 15 and the shelf assembly 1 which enable the sliding and tilting of the shelf assembly will be explained with reference to FIGS. 7–12. As illustrated in FIGS. 7 and 8, when the shelf assembly 1 is supported by the racks 14, 15, the right raised edge 20 of the right rack 14 is disposed inside guide slot 33, and the slide bar 8 is supported by the planar surface 34 of the left rack 15. When the shelf assembly 1 is inside the cabinet 12, the angle brackets 10 are located adjacent and nearly parallel to the underside of the shelf pan 2. The angle brackets 10 are supported by the left raised edge 23 of the right rack 14 and the right raised edge 24 of the left rack 15.

Figure 9:
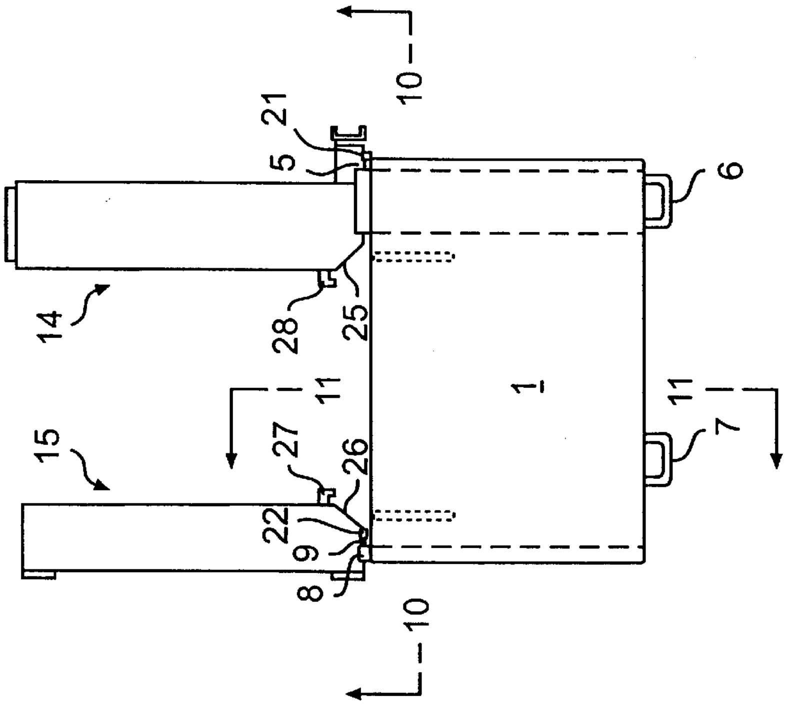
FIG. 9 is an top view of the racks and shelf assembly when the shelf assembly is horizontally drawn out of the cabinet.
Figure 10:
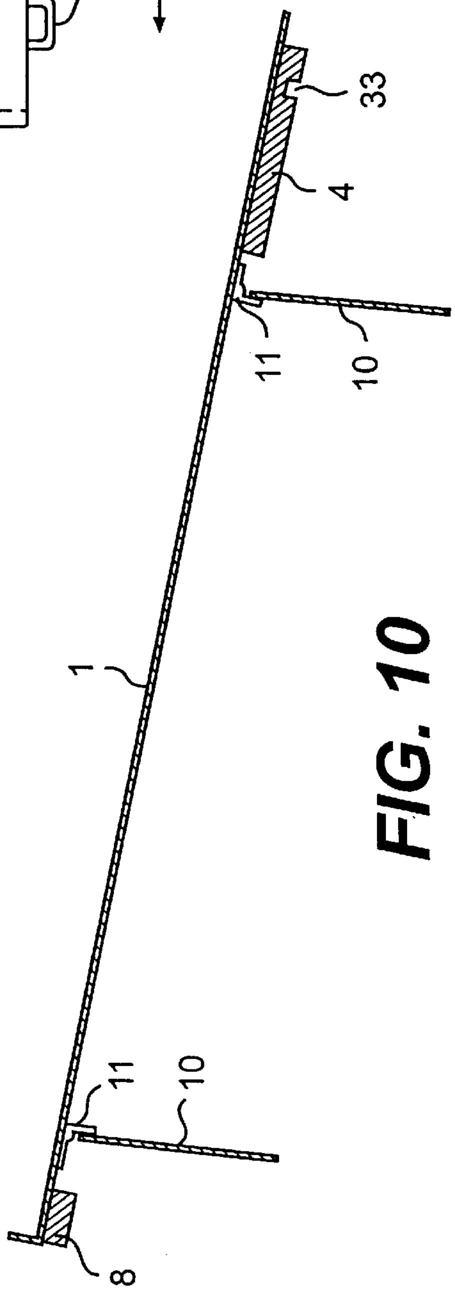
FIG. 10 is a cross sectional view taken along line 10—10 of FIG. 9.
Figure 11:
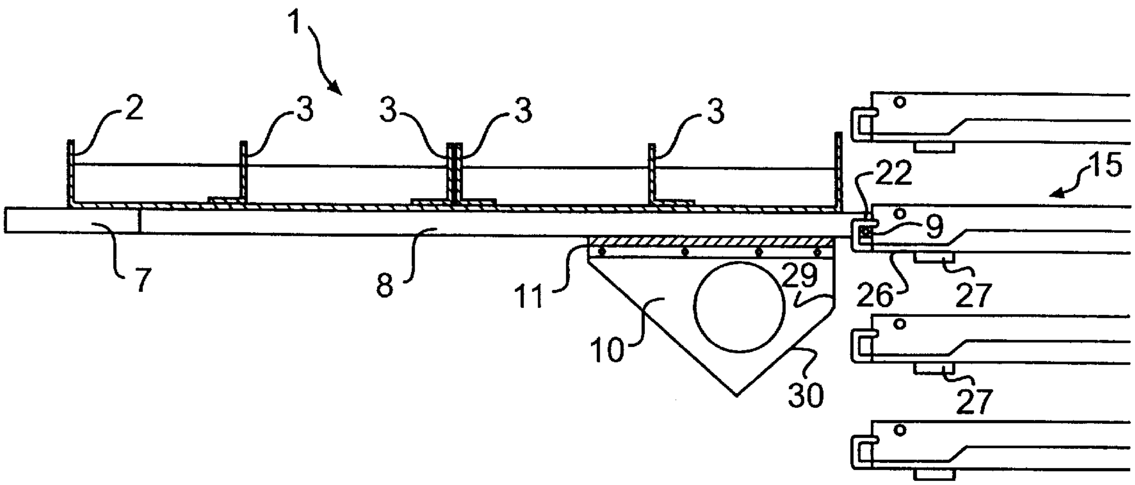
FIG. 11 is a cross sectional view showing the left rack and the shelf assembly when the shelf assembly is horizontally drawn out of the cabinet.

As illustrated in FIGS. 9–11, when the shelf assembly 1 is horizontally withdrawn from the cabinet 12 to its fullest extent, the angle brackets 10 no longer contact the left raised edge 23 of the right rack 14 or the right raised edge 24 of the left rack 15. Therefore, the angle brackets 10 are free, under the influence of gravity, to pivot about the hinges 11. Additionally, the angle brackets 10 may be spring biased to assist them in pivoting away from the undersurface of the shelf pan 2.

As best shown in FIG. 11, when the angle brackets 10 pivot, the first edge 29 of each angle bracket 10 will be angled approximately 90 degrees, with respect to the undersurface of the shelf pan 2. The first pivot pin 5 of the escapement block 4 is caught by the right hook 21 of the right rack 14. Also, the second pivot pin 9 of the slide bar 8 is caught by the left hook 22. The first and second pivot pins 5, 9 engaging in the right and left hooks 21, 22, limit the horizontal sliding extent of the shelf assembly 1 relative to the cabinet 12, thus prevent the inadvertent complete withdrawal of the shelf assembly 1 from the cabinet 12. If it is desired to remove the shelf assembly 1 from the cabinet 12, the service person need only raise the rear end of the shelf assembly 1 so that the first and second pivot pins 5, 9 clear the right and left hooks 21, 22, while the shelf assembly 1 is being withdrawn from the cabinet 12.

Figure 12:
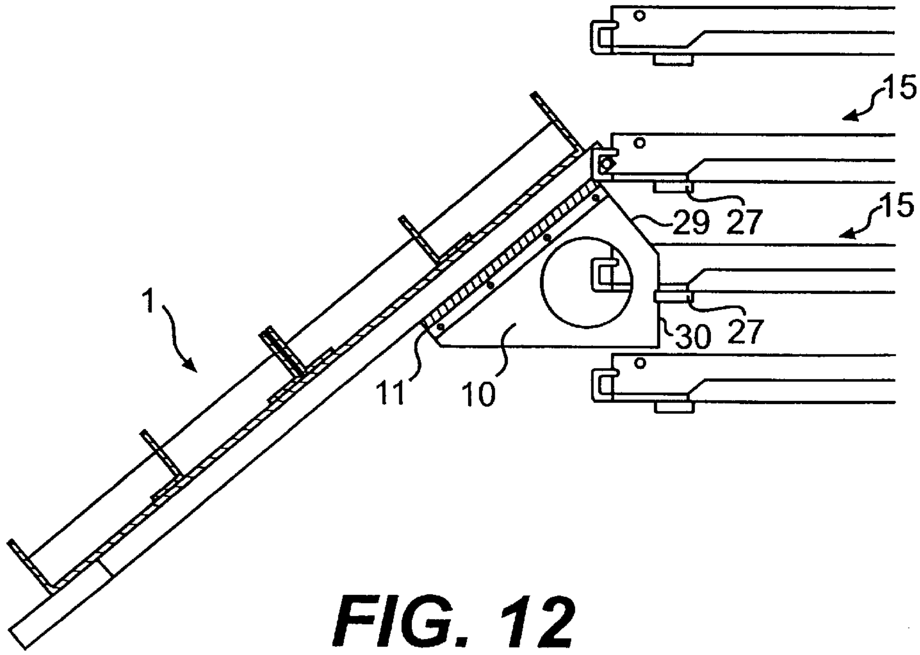
FIG. 12 is a cross sectional view showing the left rack and the shelf assembly when the shelf assembly is horizontally drawn out of the cabinet and tilted.

FIG. 12 illustrates the shelf assembly 1 in a tilted state. Once the angle brackets 10 have dropped away from the undersurface of the shelf pan 2, the service person, still holding the handles 6 and 7 gently lowers the front of the shelf assembly until the angled surfaces 30 of the angle brackets 10 engage the right and left projections 28, 27 of the next lower rack pair 14, 15. It should be noted that the relative angle between the angled surface 30 and the first surface 29 of the angle brackets 10 will determine the tilt angle of the shelf assembly 1.

By the sliding shelf assembly arrangement described above, it can be seen that the shelf may be easily withdrawn from the cabinet without the need for expensive or complicated hardware. For instance, no drawer slides, roller bearings, or other complex hardware are required. Such hardware would add the cost of additional equipment to the vending machine. Further, the hardware would require space accommodations on both sides of the shelf assembly.

Referring now to FIGS. 13A, 13B, 13C, and 14, the elevator system 50 of the present invention will be described. The elevator system 50 is mounted to the interior, right side wall of the cabinet 12. The primary function of the elevator system 50 is to receive a beverage container C item from a designated shelf assembly 1 and to deliver that beverage container C to the delivery mechanism 200.

Figure 13A:
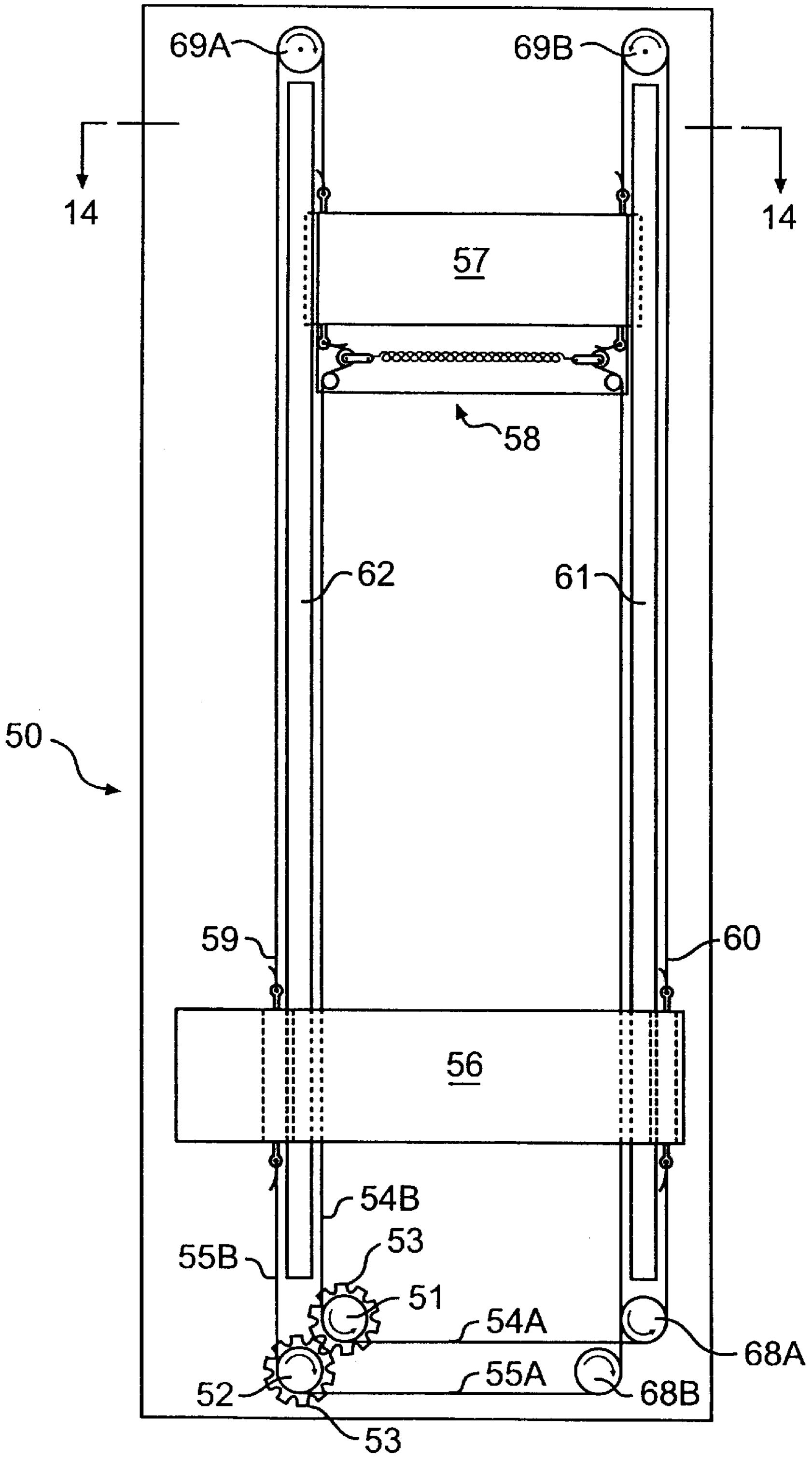
FIG. 13A is a side view of an elevator system according to the present invention.

FIG. 13A shows the elevator system components. The elevator system 50 includes two interconnected drive pulleys 51 and 52. The drive pulleys 51 and 52 are interconnected by intermeshed gears 53. Alternatively, the drive pulleys 51 and 52 may be interconnected by belts, a direct frictional engagement, or any form of transmission. A motor drives at least one of the drive pulleys 51 and 52, or at least one of the gears 53, either directly or though a transmission system.

Figure 13B:
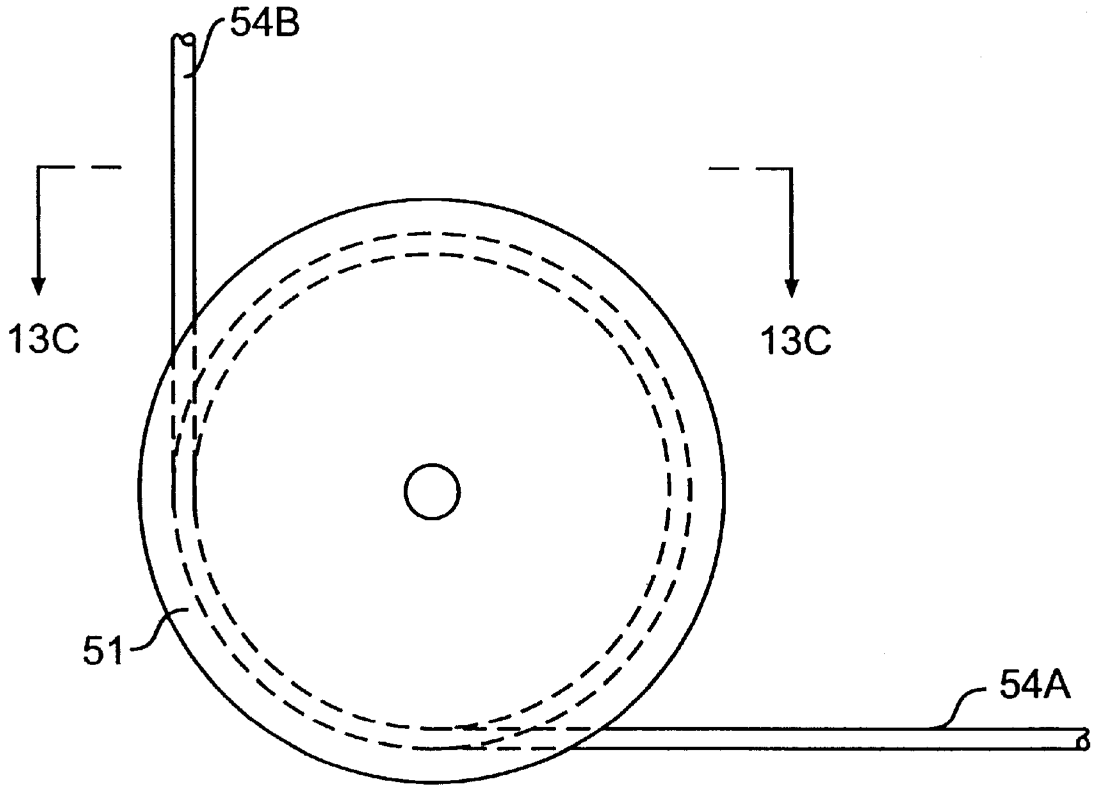
FIG. 13B is side view of a drive pulley of the elevator system.
Figure 13C:
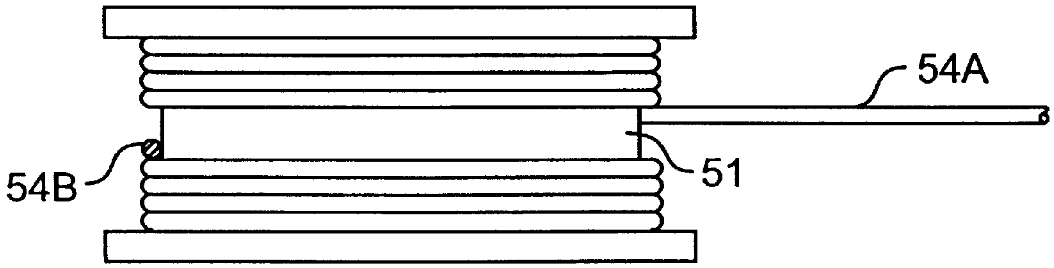
FIG. 13C is a cross sectional view taken along line 13C—13C of FIG. 13B.

FIGS. 13B and 13C illustrate drive pulley 51, with its associated gear 53 removed to simplify the illustration. The drive pulley 51 is configured as a cylindrical drum with a flange formed on each end of the cylindrical drum. Drive cables 54A and 54B are wound about, and hence driven by, drive pulley 51. Drive pulley 52 is substantially identical in structure to drive pulley 51, and includes drive cables 55A and 55B wound thereabout, and hence driven thereby.

As illustrated in FIGS. 13A through 13C, drive cables 54A and 54B are wrapped around the drive pulley 51, such that drive cable 54A is wound-up upon paying-out of drive cable 54B, and visa versa. Drive cable 54A has one end attached to drive pulley 51, is wrapped about drive pulley 51 several times, then extends over a first idler pulley 68A and has its other end attached to an elevator back plate 56. Drive cable 54B has one end attached to drive pulley 51, is wrapped about drive pulley 51 several times, then extends through a cable tensioning mechanism 58 and has its other end attached to a counterweight 57.

Similarly, drive cables 55A and 55B are wrapped about the drive pulley 52, such that drive cable 55A is wound-up upon paying-out of drive cable 55B, and visa versa. Drive cable 55A has one end attached to drive pulley 52, is wrapped about drive pulley 52 several times, extends over a second idler pulley 68B, extends through the cable tensioning mechanism 58, and has its other end attached to the counterweight 57. Drive cable 55B has one end attached to drive pulley 52, is wrapped about drive pulley 52 several times, and has its other end attached to the elevator back plate 56.

As shown in FIG. 13A, the cable tensioning mechanism 58 includes a plurality of tensioning pulleys through which the drive cables 54B and 55A pass. At least two of the tensioning pulleys are spring biased, so as to pull any slack out of the drive cables 54B and 55A. The at least two of the tensioning pulleys may be connected by a common spring (as is illustrated) or may be separately biased by individual springs, counterweights, or other forms of biasing devices.

Two bearing cables 59 and 60 are also connected to the elevator back plate 56 and the counterweight 57. Bearing cable 59 has one end connected to the elevator back plate 56, passes over a third idler pulley 69A, and is then connected at its other end to the counterweight 57. Bearing cable 60 has one end connected to the counterweight 57, passes over a fourth idler pulley 69B, and is then connected at its other end to the elevator back plate 56.

As best seen in FIG. 14, front and back guide bars 61 and 62 are attached to the interior, right side wall of the cabinet 12. The counterweight 57 includes protrusions 63 which are slidable inside internal slots 64 of the front and back guide bars 61 and 62. Likewise, the elevator back plate 56 includes protrusions 67 which are slidable inside external slots 66 of the front and back guide bars 61 and 62. Since, the protruding dents 67 of the elevator back plate 56 include standoffs 65, the elevator is spaced slightly away from the guide bars 61 and 62. Therefore, the elevator back plate 56 and the counterweight 57 may pass one another while sliding in the guide bars 61 and 62.

Now, with particular reference to FIGS. 15–17, the elevator carry platform 70 will be described. The elevator carry platform 70 is rigidly attached to the elevator back plate 56. The primary function of the elevator carry platform 70 is to support a beverage container C while it is being moved from a designated shelf assembly 1 to the delivery mechanism 200, and to dispense the beverage container C to the delivery port 100.

The elevator platform 70 includes a flange portion 71 rigidly attached to the elevator back plate 56. The flange portion is encircled by a conveyor belt 73. The flange portion 71 includes a slanted portion 72 which is inclined relative to horizontal, such that a beverage container C located on the slanted portion 72 would tend to roll or slide toward the conveyor belt 73. The conveyor belt 73 is supported on the flanged portion 71 by suitable roller guides 74. A suitable drive mechanism causes selective movement of the conveyor belt 73.

During operation, the drive pulleys 51 and 52 are caused to rotate and thereby move the drive cables 54A, 54B, 55A and 55B. Movement of the drive cables 54A, 54B, 55A and 55B causes the elevator carrying platform 70 to move vertically. The elevator carrying platform 70 is moved to a desired location adjacent a designated shelf assembly 1 under the control of a master controller.

Figure 35:
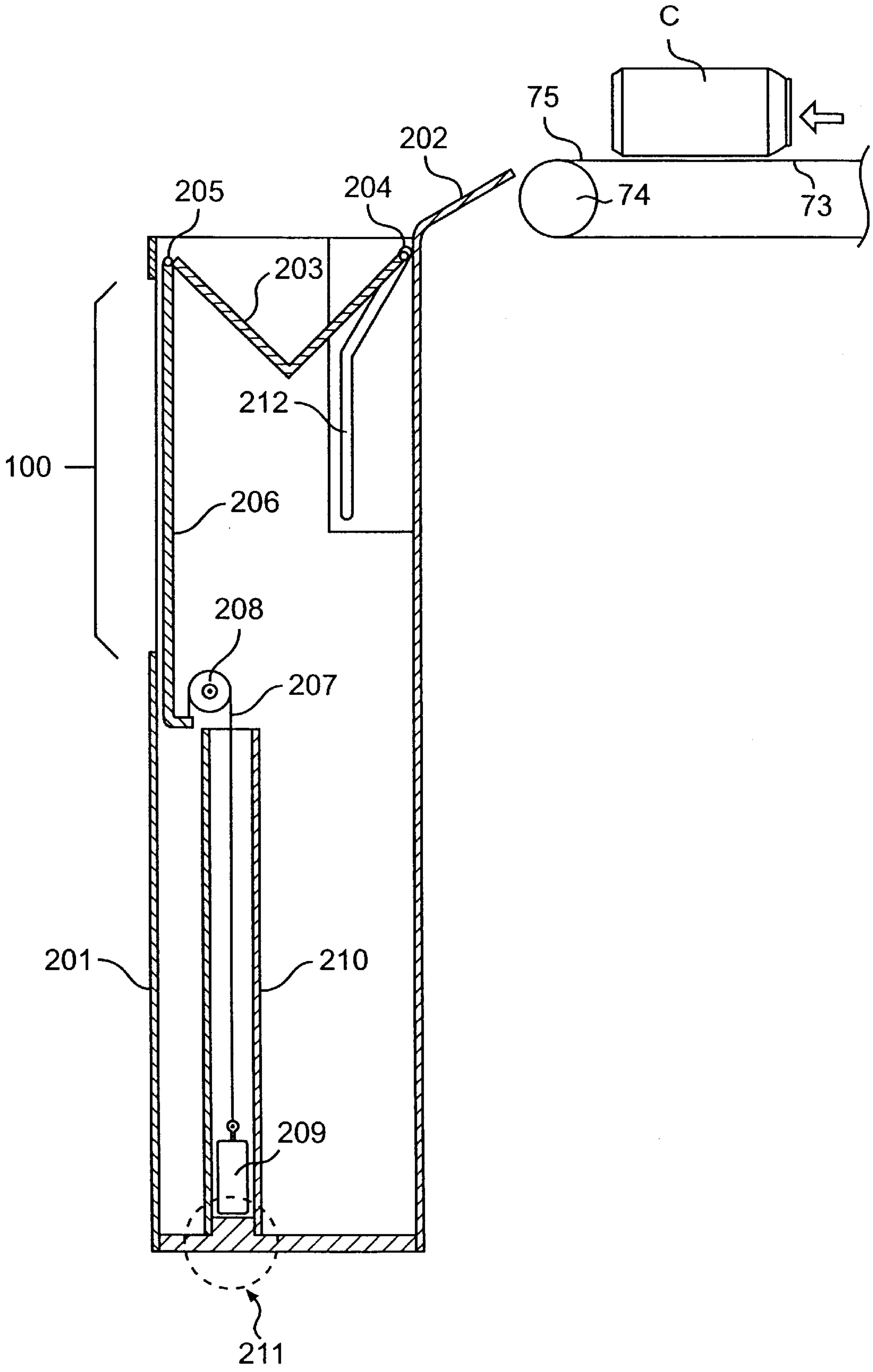
FIG. 35 is a cross sectional view of a delivery mechanism just prior to receiving a beverage container.
Figure 36:
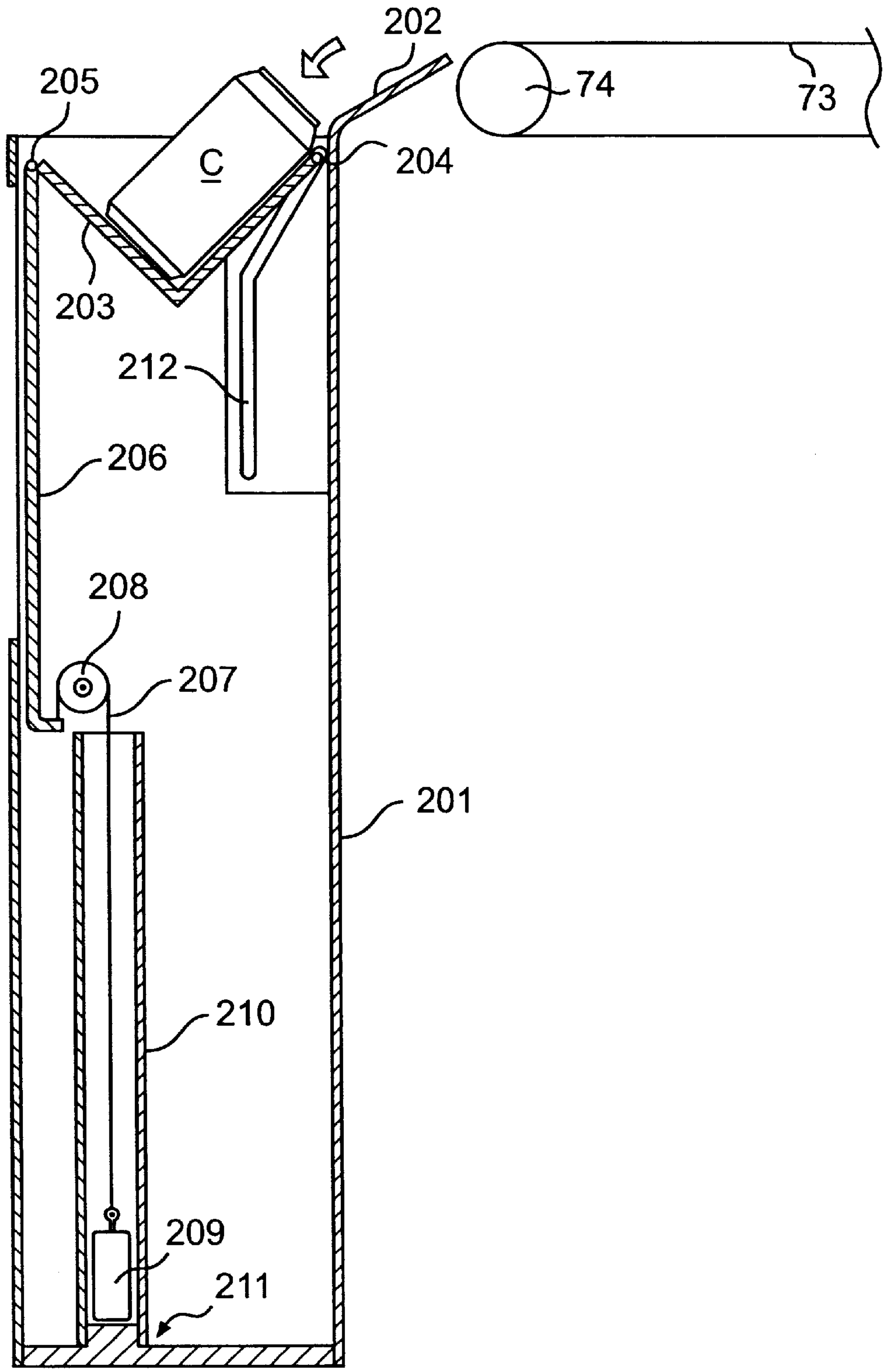
FIG. 36 is the same cross sectional view as FIG. 35 with the delivery mechanism receiving the beverage container.

Once the elevator carrying platform 70 is located adjacent the designated shelf assembly 1, a beverage container C is dispensed from the escapement block 4 onto the slanted-portion 72. The beverage container C slides or rolls onto the conveyor belt 73. Next, the drive pulleys 51 and 52 are activated in order to drive the drive cables 54A, 54B, 55A and 55B to cause the elevator carrying platform 70 to move vertically into alignment with the delivery mechanism 200. As illustrated in FIGS. 35 and 36, the conveyor belt 73 then transports the beverage container C off a forward edge 75 of the conveyor belt 73 and into the delivery mechanism 200.

Now, with particular reference to FIGS. 35–40, the delivery mechanism 200 will be described. The delivery mechanism 200 is attached to a back face of the vending machine's door. The primary function of the delivery mechanism 200 is to receive a beverage container C from the elevator carrying platform 70, and to gently move the beverage container C to a position adjacent the delivery port 100, so as to present the beverage container C to a customer in an upright orientation at a convenient height.

The delivery mechanism 200 includes an outer housing 201. The outer housing 201 has an open top, open bottom, and an opening in a forwardly facing sidewall. The opening in the forwardly facing sidewall corresponds in size and position to an opening in the vending machine's door and constitutes the delivery port 100.

A ramp 202 is formed along the upper edge of a rearwardly facing sidewall of outer housing 201. The ramp extends at an angle of approximately forty-five degrees to horizontal. The ramp 202 serves to guide a beverage container C into the open top of the outer housing 201 after the beverage container C has been delivered from the forward edge 75 of the conveyor belt 73.

An L-shaped platform 203 is movably, attached to the outer housing 201 adjacent the open top of the outer housing 201. The L-shaped platform 203 is formed by the juncture of two legs, having an angle of approximately ninety degrees therebetween. A rearward edge of the L-shaped platform 203 includes a platform guide pin 204. The platform guide pin 204 includes two extension portions extending past opposite side edges of the L-shaped platform 203. The two extension portions are captured within channel guides 212 formed within opposite sides of the outer housing 201 so as to guide the movement of the rearward edge of the L-shaped platform 203.

A forward edge of the L-shaped platform 203 includes a hinge 205. The hinge 205 is also attached to an upper edge of a delivery port door 206. By this arrangement, the delivery port door 206 is pivotally attached to the L-shaped platform 203.

A lower edge of the delivery port door 206 is connected to one end of a flexible cable 207. The flexible cable 207 passes over a guide pulley 208 and has its other end connected to a weight 209. The weight 209 is guided for vertical translation by a guide housing 210. The guide housing 210 is connected to a delivery port door opening mechanism 211, which will be explained in greater detail with reference to FIG. 40.

The act of dispensing a beverage container C, using the delivery mechanism 200, will be described in conjunction with FIGS. 35–39. As illustrated in FIGS. 35 and 36, the L-shaped platform 203 is initially located in an elevated position adjacent the open top of the outer housing 201. In the elevated position, the two legs of the L-shaped platform 203 are oriented at an angle of approximately forty-five degrees relative to horizontal, and the L-shaped platform 203 is ready to receive a beverage container C from the elevator carrying platform 70.

Figure 37:
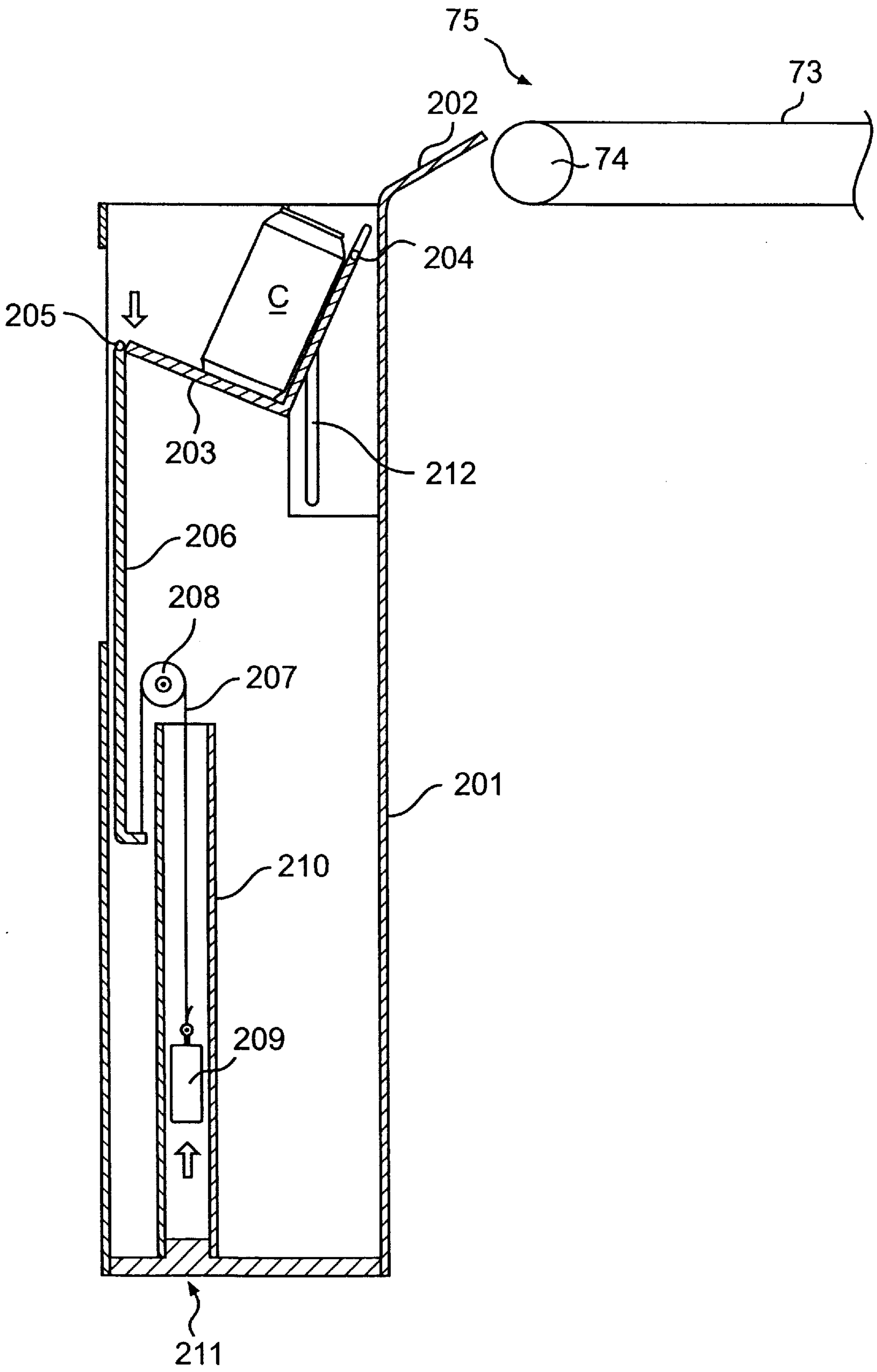
FIG. 37 is the same cross sectional view as FIG. 35 with the delivery mechanism lowering the beverage container, and opening a delivery port door.

Once a beverage container C is received by the L-shaped platform 203, as illustrated in FIG. 37, the weight of the beverage container C causes the L-shaped platform 203 to descend. The descent of the rearward edge of L-shaped platform 203 is guided by the engagement between the extension portions of the platform pin 204 and the channel guides 212 formed in the outer housing 201. The descent of the forward edge of the L-shaped platform 203 is guided by the delivery port door 206, which includes side edges that run in tracks formed in the outer housing 201.

Figure 38:
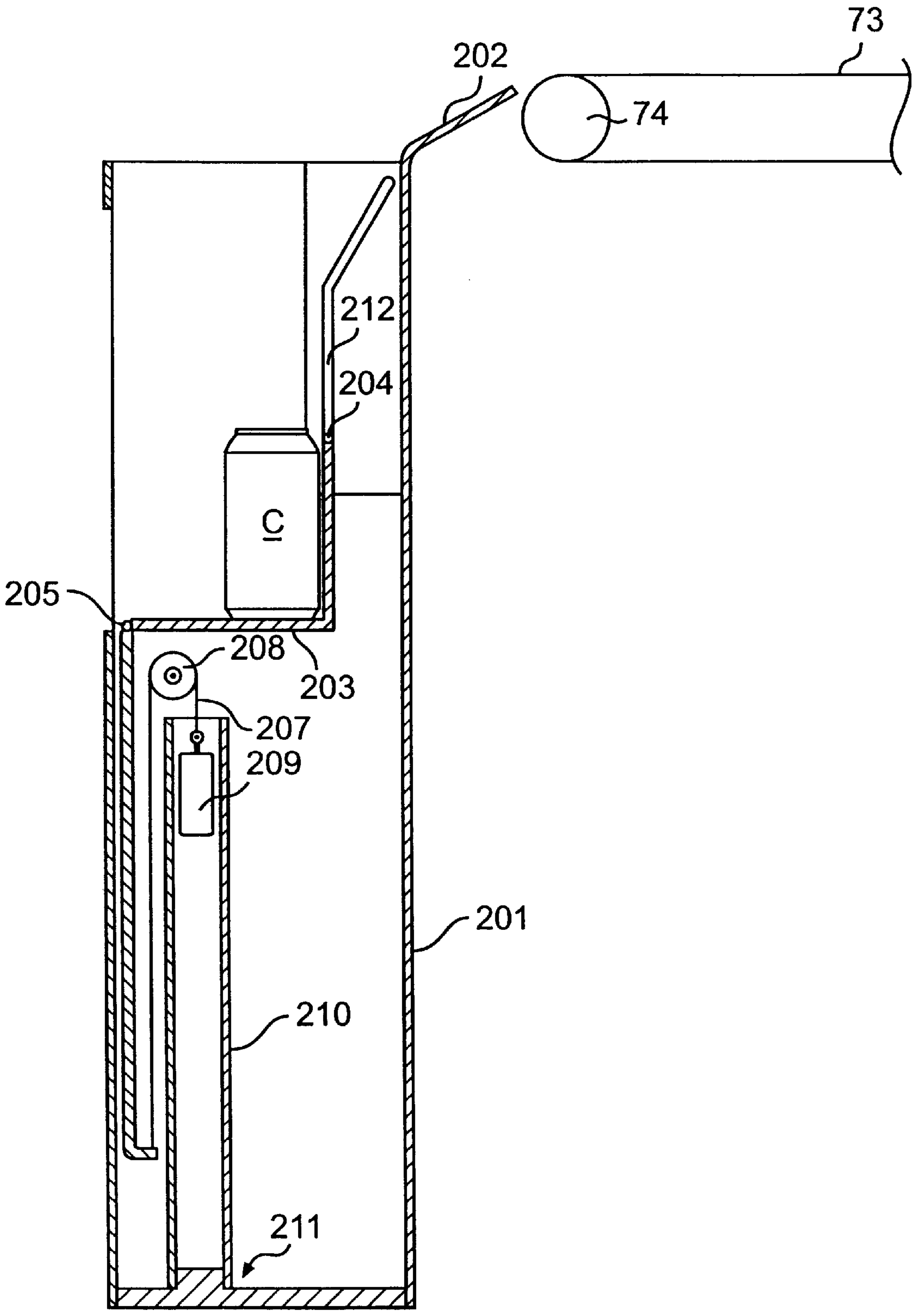
FIG. 38 is the same cross sectional view as FIG. 35 with the delivery port door completely open, allowing customer access to the beverage container.
Figure 39:
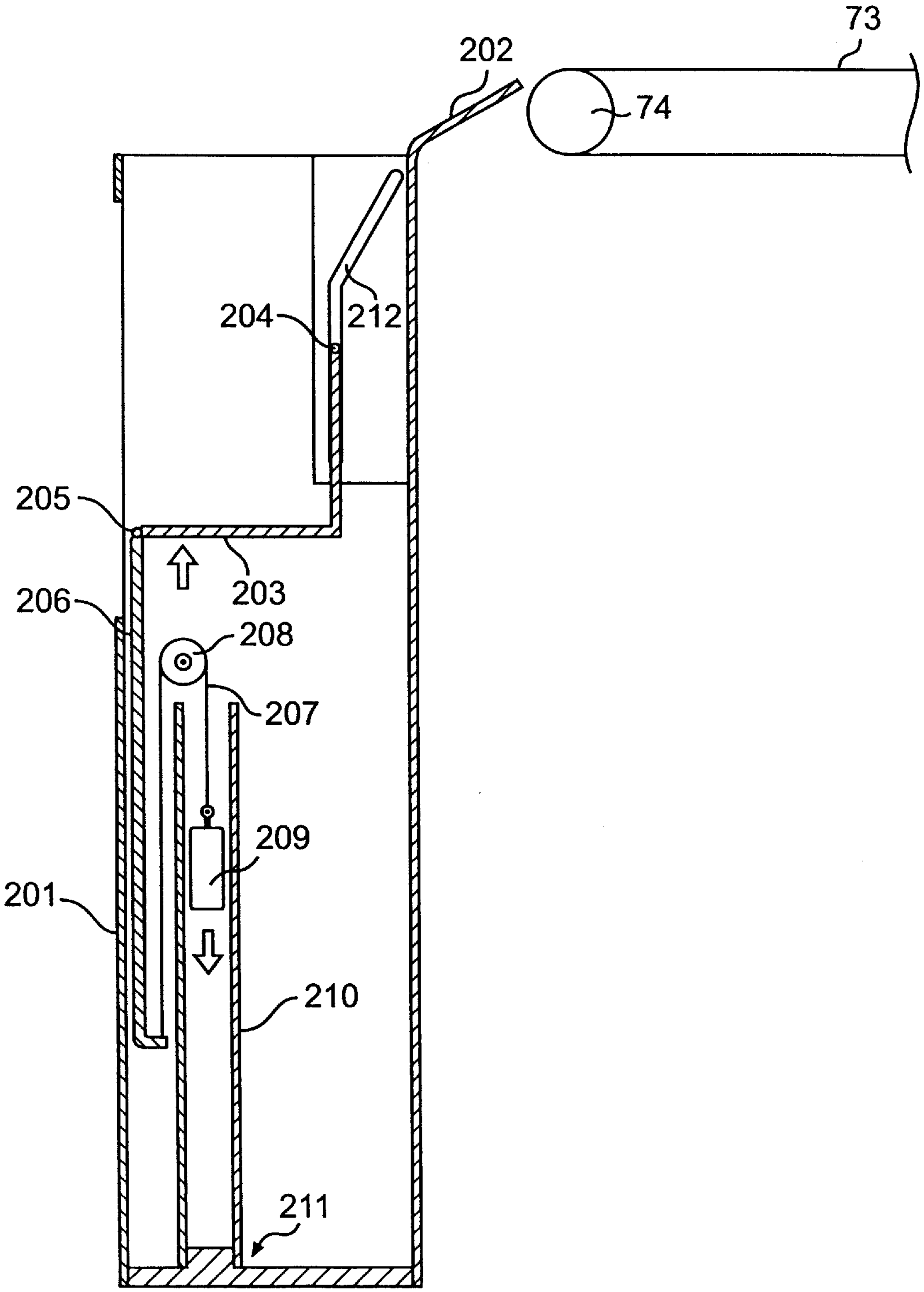
FIG. 39 is the same cross sectional view as FIG. 35 with the beverage container removed from the delivery mechanism, and the delivery port door closing.

FIG. 38 illustrates the lowest position of descent of the L-shaped platform 203. At this position, one leg of the L-shaped platform 203 is horizontal, while the other leg is vertical. The delivery port door 206 has been completely lowered, thus providing access to the beverage container C, via the delivery port 100. FIG. 39 illustrates the delivery mechanism once the beverage container C has been removed by the customer. Once the beverage container has been removed, the weight 209 causes the L-shaped platform 203 to ascend back to its elevated position of FIG. 35.

The speed of the descent and ascent of the L-shaped platform 203 is controlled by the speed of the vertical movement of the weight 209 within the guide housing 210. The speed of the vertical movement of the weight 209 is determined by the delivery port door opening mechanism 211. The delivery port door opening mechanism 211 controls the speed by regulating an air pressure between the weight 209 and the guide housing 210.

The guide housing 210 has an air tight seal to a floor 213, which closes the open bottom of the outer housing 201. The cross-sectional configuration of the weight 209 is symmetrical to the cross-sectional configuration of the guide housing 210, but slightly smaller, thereby allowing air to slowly leak past the weight 209 and the walls of the guide housing 210. Therefore, the vertical movement of the weight 209 is retarded by an air vacuum formed beneath the weight when the weight is ascending, and a pressure formed beneath the weight 209 when the weight 209 is descending.

Figure 40:
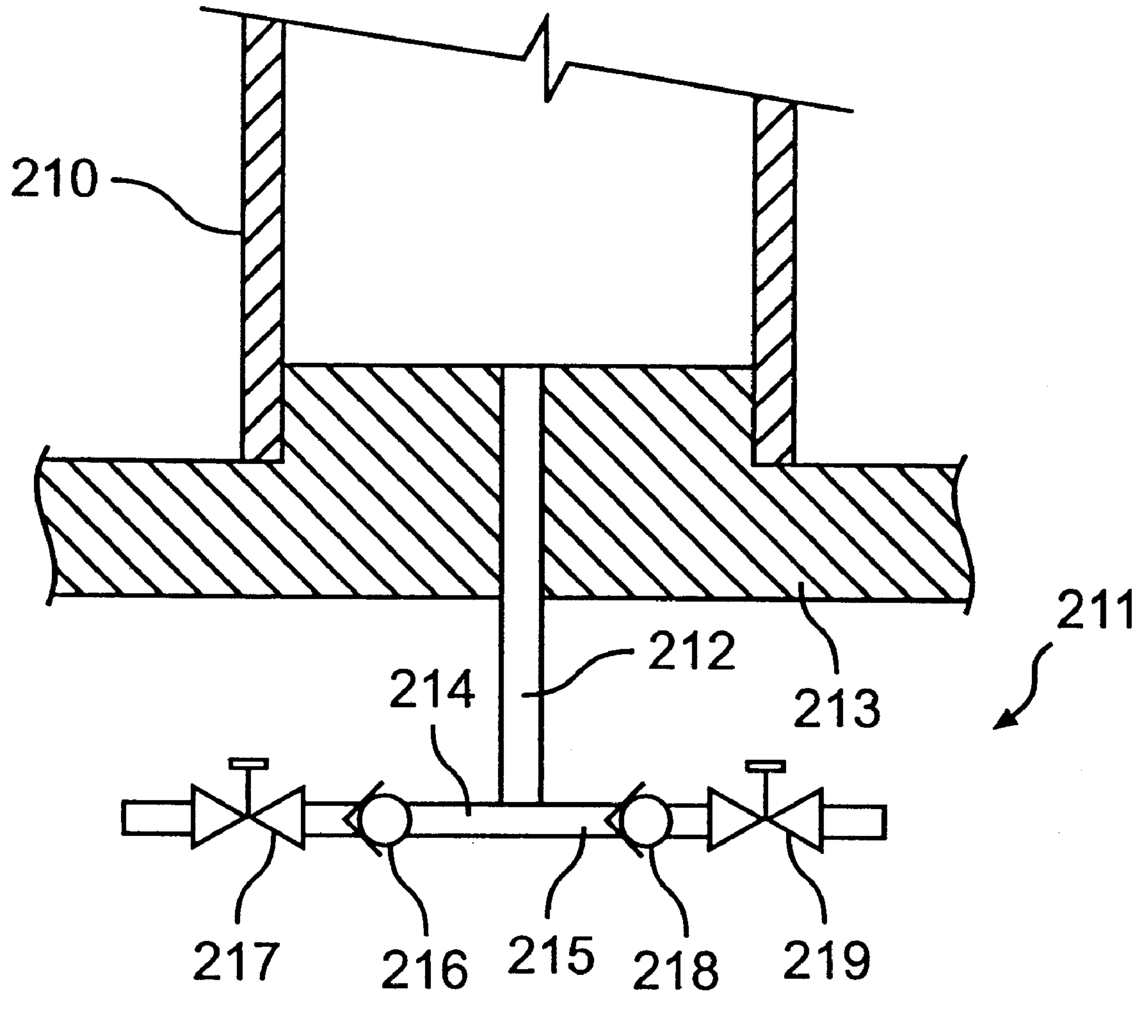
FIG. 40 is a close-up view of a delivery port opening mechanism enclosed within the dashed circle 211 of FIG. 39.

As illustrated in FIG. 40, the delivery port door opening mechanism 211 includes an air channel 212 communicating with a bottom of the guide housing 210. The air channel 212 branches into an air intake channel 214 and an air exhaust channel 215. The air intake channel 214 includes an intake check valve 216, which will only allow air to flow toward the air channel 212. An intake needle valve 217 is provided upstream of the intake check valve 216. By this arrangement, the ascent speed of the weight 209, and hence the descent speed of the L-shaped platform 203, can be controlled by adjusting the intake needle valve 217.

Similarly, the air exhaust channel 215 includes an exhaust check valve 218, which will only allow air to flow away from the air channel 212. An exhaust needle valve 219 is provided downstream of the exhaust check valve 218. By this arrangement, the descent speed of the weight 209, and hence the ascend speed of the L-shaped platform 203, can be controlled by adjusting the exhaust needle valve 219.

Now, reference will once again be made to FIGS. 15–17 in describing the operation of a solenoid actuator mechanism 80. FIG. 15 illustrates four solenoid actuator mechanisms 80 attached to an undersurface of the elevator carrying platform 70. Each of the solenoid actuator mechanisms 80 is selectively capable of provoking the escapement block 4 to dispense a beverage container.

Each solenoid actuator mechanism 80 includes an electromagnetic winding 81 which reciprocally controls a plunger 82. A bumper 83 is attached to an end of the plunger 82. The bumper 83 makes contact with a portion of the escapement block 4 to cause the escapement block 4 to dispense a beverage container C, as will be more fully described in conjunction with the description of the escapement block 4 to follow.

FIG. 16 illustrates the solenoid actuator mechanism 80 in an inactive state. In the inactive state, no power is supplied to the electromagnetic winding 81 of the solenoid actuator mechanism 80 by the master controller. In the inactive state, the elevator carrying platform 70 is free to-vertically move along the guide blocks 61 and 62 past the shelf assemblies 1 without causing any of the escapement blocks 4 to dispense beverage containers. No dispensing occurs because the bumper 83 is retracted toward the electromagnetic winding 81, and therefore does not physically contact any of the escapement blocks 4 of the shelf assemblies 1.

FIG. 17 illustrates the solenoid actuator mechanism 80 in an active state. In the active state, power is supplied to the electromagnetic winding 81 of the solenoid actuator mechanism 80 by the master controller. Once the master controller determines that the elevator carrying platform 70 is adjacent the desired shelf assembly 1, the master controller supplies power to the electromagnetic winding 81 of one or more of the four solenoid actuator mechanisms 80. The plunger 82 of the selected solenoid actuator mechanism 80 extends to cause the bumper 83 to contact a portion of the escapement block 4.

When the bumper 83 contacts a portion of the escapement block 4, a beverage container, located near the portion of the escapement block contacted, is dispensed onto the slanted portion 72 of the elevator carrying platform 70. It should also be noted that more than one of the solenoid actuator mechanisms 80 may be simultaneously actuated. This simultaneous actuation could be used to simultaneously dispense two individual beverage containers from a single shelf assembly 1 onto the elevator carrying platform 70, or could be used to activate two portions of the escapement block 4, wherein both of the portions of the escapement block 4 must be activated before a large sized beverage container will be dispensed to the elevator carrying platform 70. The functions of the escapement block will be described in more detail later in the specification.

Figure 18:
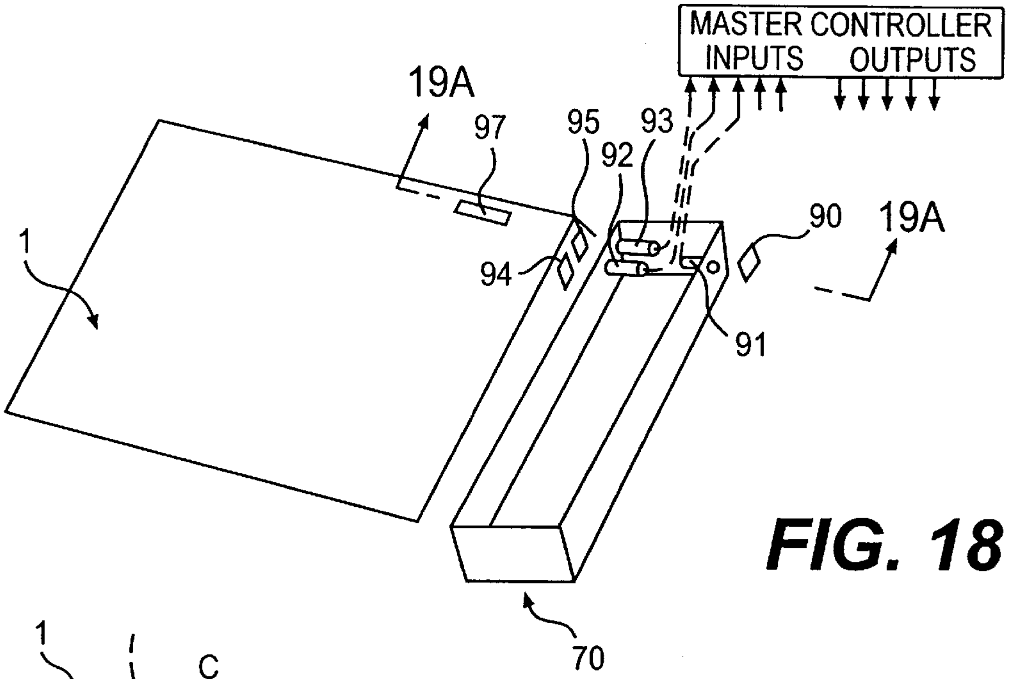
FIG. 18 is a right side perspective view of a control sensor arrangement.

FIGS. 18–20 illustrate a sensor arrangement for use by the master controller of the vending machine. The primary functions of the sensor arrangement are to determine the relative position of the elevator carrying platform 70, the shelf assemblies 1, and the cabinet 12, and to determine the stock status of beverage containers to be vended.

The elevator carrying platform 70 includes a first sensor 91, a second sensor 92, and a third sensor 93. The first, second and third sensors 91, 92, and 93 are optical sensors, each including both a transmitter and a receiver of light rays. Alternatively, the sensors may be inductive coil type sensors or reed switches, physical parameter sensors, or other types of known sensors.

The first sensor 91 of the elevator carrying platform 70 faces toward the interior, right side wall of the cabinet 12. Placed along the interior, right side wall are first indicators 90. The first indicators 90 are in the form of stickers or decals, or magnets if the first sensor 91 is a reed switch. Each decal is reflective and includes a code, such as a bar code, which can be easily read by the first sensor 91.

Three decals are adhered to the side wall. A first decal is adhered near the topmost extent of the elevator shaft 16. A second decal is adhered near the lowermost extent of the elevator shaft 16, and a third decal is adhered to the sidewall adjacent the delivery mechanism 200.

The second sensor 92 of the elevator carrying platform faces toward the shelf assemblies 1. Each shelf assembly 1 includes a second indicator 94. The second indicator 94 is attached to a portion of the escapement block 4, or the shelf assembly itself, which faces toward the elevator shaft 16. The second indicator 94 of each shelf assembly 1 is reflective and includes a code, such as a bar code. Alternatively, the second indicators 94 are magnets, if the second sensor 92 is a reed switch. The respective codes may be read by the second sensor 92, and used by the master controller to identify the shelf.

The third sensor 93 of the elevator carrying platform 70 also faces toward the shelf assemblies 1. Each shelf assembly 1 includes a third indicator 95. The third indicator 95 is attached to a moveable member which is located below the shelf pan 2 and adjacent to the escapement block 4. The third indicator 95 also faces toward the elevator shaft 16, and has as its primary function to signal to the third sensor 95 whether a beverage container C normally found on the shelf assembly 1 is in-stock or out-of-stock.

Figure 19A:
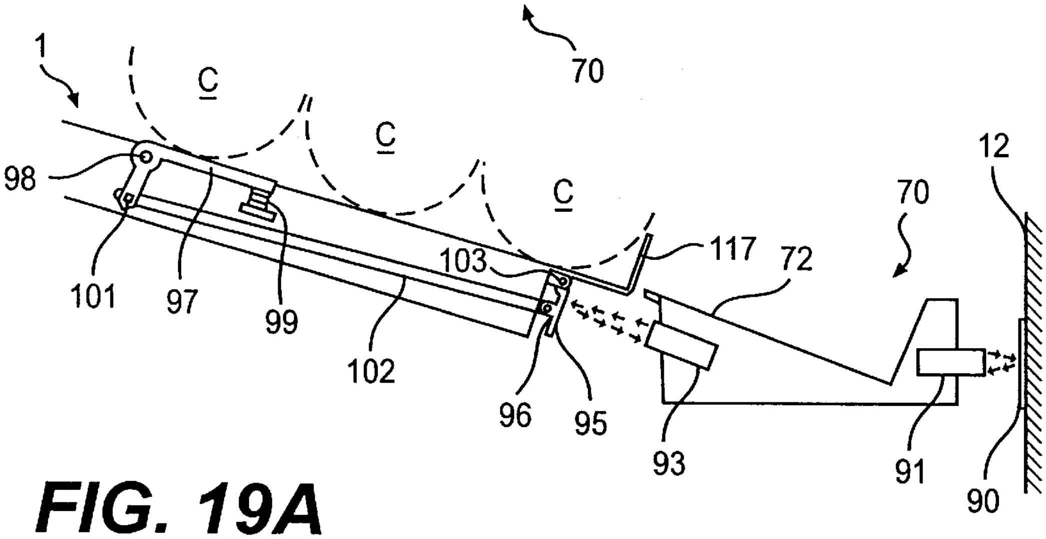
FIG. 19A is a cross sectional view taken along line 19A—19A of FIG. 18, illustrating an optical, out-of-stock indicator indicating an in-stock condition.
Figure 20A:
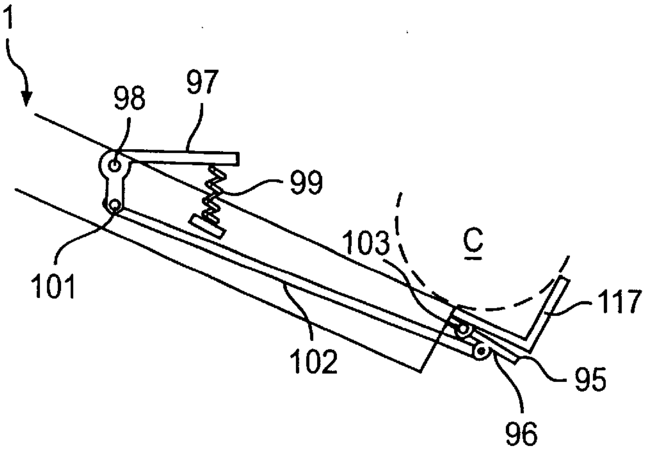
FIG. 20A is a cross sectional view of the optical, out-of-stock indicator, of FIG. 19A, indicating an out-of-stock condition.

In an embodiment illustrated in FIGS. 19A and 20A, the third indicator 95 of each shelf assembly 1 is reflective, and may include a code. FIG. 19A shows the lower right end of a shelf assembly 1 with beverage containers C supported thereon, and held back by the first gate 117. The weight of at least one of the beverage containers C is rested upon a paddle 97.

Paddle 97 is L-shaped and includes a first pivot point 98. A spring 99 tends to rotate the paddle 97 counterclockwise about the first pivot point 98, however the weight of the beverage container C is sufficient to overcome the biasing force of the spring 99. Therefore, a longer extent of the paddle 97, which contacts the beverage container C, tends to lye flat against the shelf pan 2 when a beverage container is located above the paddle 97.

A shorter extend of the paddle 97 includes a second pivot 101 at its remote end. A linkage rod 102 is connected between the second pivot 101 and a back side of a swingable backboard 96. The swingable backboard 96 pivots about a third pivot point 103.

When a beverage container C is located above the paddle 97, the linkage rod 102 tends to swing the backboard 96 about the third pivot point 103 so that the backboard 96 is substantially perpendicular to the shelf pan 2. In the perpendicular orientation, the third indicator 95, which is attached to the backboard 96, is detectable by the third sensor 93.

As illustrated in FIG. 20A, when a beverage container C is not located above the paddle 97, the spring 99 causes the paddle 97 to rotate counterclockwise. The counterclockwise rotation of the paddle 97 causes the linkage rod 102 to swing the backboard 96 counterclockwise about the third pivot point 103 so that the backboard 96 is nearly parallel to the shelf pan 2. In the nearly parallel orientation, the third indicator 95 which is attached to the backboard 96 is not detectable by the third sensor 93.

Figure 19B:
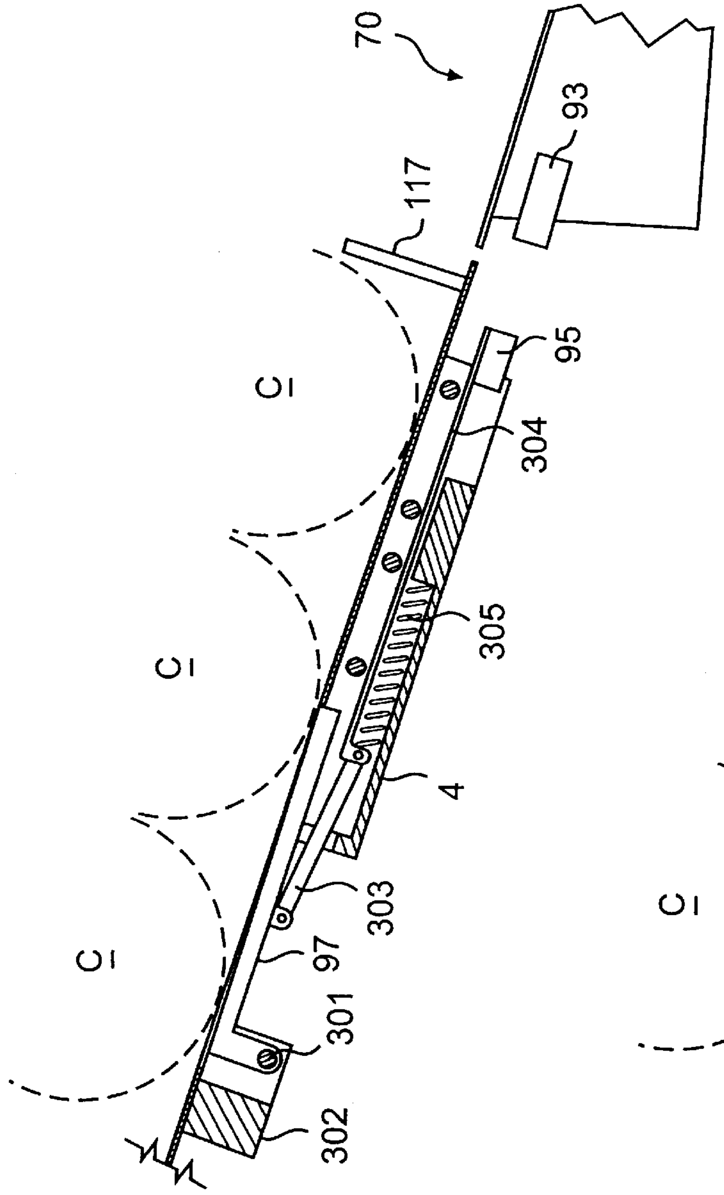
FIG. 19B is a cross sectional view similar to FIG. 19A, illustrating an alternative magnetic, out-of-stock indicator indicating an in-stock condition.
Figure 20B:
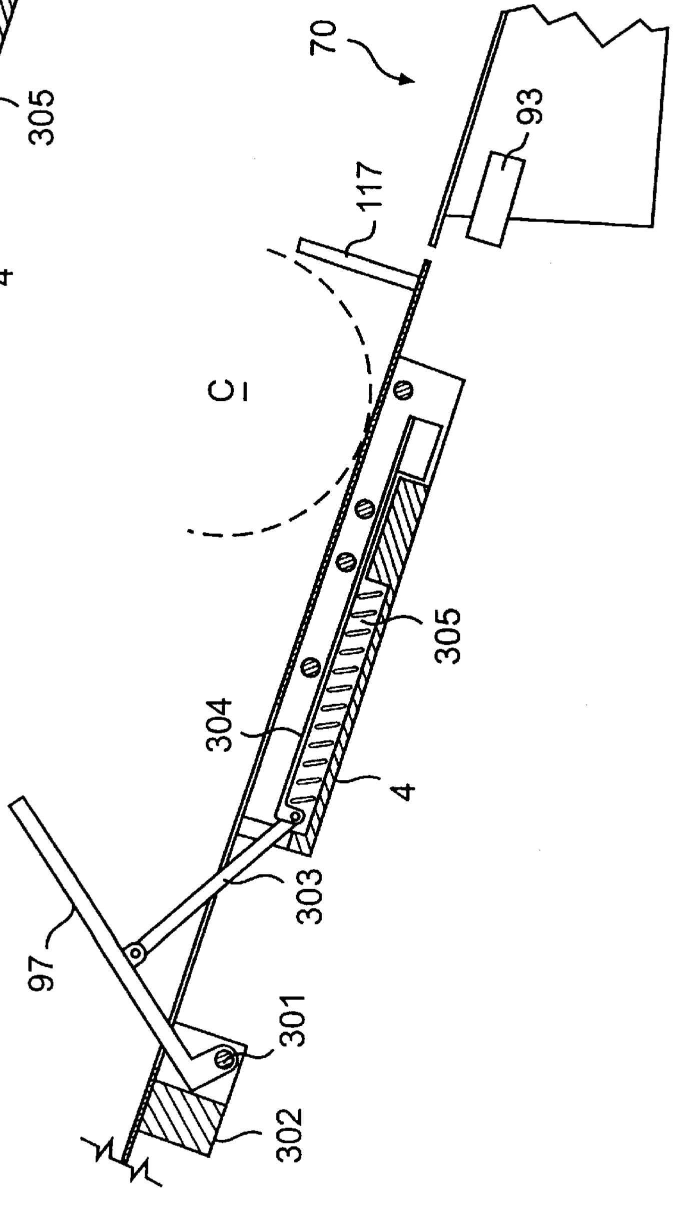
FIG. 20B is a cross sectional view of the magnetic, out-of-stock indicator, of FIG. 19B, indicating an out-of-stock condition.

In an embodiment illustrated in FIGS. 19B and 20B, the third indicator 95 of each shelf assembly 1 is a magnet, and the third sensor 93 is a reed switch. The components involved in this embodiment are less expensive, and hence this is the preferred embodiment. FIG. 19B shows the lower right end of the shelf assembly 1 with beverage containers C supported thereon, and held back by the first gate 117. Again, the weight of at least one of the beverage containers C is rested upon the paddle 97.

In this embodiment, the actuating linkage assembly between the paddle 97 and the third indicator 95, i.e. the magnet, is different. Here, the paddle 97 is L-shaped and includes a shorter extent having a pivot point 301 at one end. The pivot 301 is connected to a paddle frame 302. A longer extent of the L-shaped paddle 97 contacts beverage containers C on the shelf assembly 1.

A linkage rod 303 is connected to a midportion of the longer extent of the L-shaped paddle 97 and to a sliding member 304. The connections between the linkage rod 303 and the L-shaped paddle 97 and sliding member 304 are hinged. The sliding member 304 is guided for transverse movement within the escapement block 4.

A spring 305 engages the connection between the sliding member 304 and the linkage rod 303. The spring 305 applies a biasing force to this connection away from the elevator shaft 16. This biasing force tends to rotate the paddle 97 counterclockwise about the pivot 301, however the weight of the beverage container C is sufficient to overcome the biasing force of the spring 305. Therefore, the longer extent of the paddle 97, which contacts the beverage container C, tends to lye flat against the shelf pan 2, when a beverage container C is located above the paddle 97.

While the longer extent of the paddle 97 is lying flat against the shelf pan 2, the third indicator 95 is located at a relatively close position to the elevator shaft 16. In this close position, the third sensor 93 can detect the third indicator 95, since the magnet of the third indicator 95 will radiate a field near the reed switch of the third sensor 93. The close position corresponds to an in-stock condition.

As illustrated in FIG. 20B, when a beverage container C is not located above the paddle 97, the spring 305 causes the paddle 97 to rotate counterclockwise. The counterclockwise rotation of the paddle 97 causes the third indicator 95 to move to a position more remote from the elevator shaft 16. In this remote position, the third sensor 93 cannot detect the third indicator 95, since the radiated field of the magnet of the third indicator 95 will be distanced from the reed switch of the third sensor 93. The remote position corresponds to an out-of-stock condition.

FIGS. 19A and 19B illustrate that one or two beverage containers C can be held in escrow at the time that the out-of-stock indication is given. In other words, when the paddle 97 is free to rotate counterclockwise, at least one beverage container C will still be present on the shelf pan 2. Although two beverage containers C are shown in escrow, the out-of-stock indicator could be modified so that more or less beverage containers, or no beverage containers, are held in escrow, by simply moving the location of the paddle 97 relative to the shelf pan 2. Holding a beverage container in escrow is advantageous since upon reloading of the machine with ambient temperature beverage cans, at least the next-to-be-vended beverage container or containers will be in a chilled condition and therefore appropriate for immediate sale.

Although only one out-of-stock indicator has been illustrated on the escapement block 4 of each shelf assembly 1, it would be feasible that a plurality of out-of-stock indicators could be included on the escapement block 4 of each shelf assembly 1. For example, if the shelf assembly 1 had its dividers 3 arranged to vend four beverage containers, then four out-of-stock indicators could be employed to indicate the out-of-stock status of each of the four different beverage containers to be vended from this shelf assembly 1. Of course in this case, the elevator carrying platform 70 would also include four third sensors 93. The four third sensors 93 would be spaced along the elevator carrying platform 70 to correspond to the locations of the four out-of-stock indicators of the escapement block 4 of the shelf assembly 1.

It should be noted that the out-of-stock indication is given by the shelf assembly 1 using a purely mechanical device. Therefore, nonelectrical connection needs to be established between the vending machine and respective ones of the shelf assemblies to report the stock status of the respective shelf assemblies. This is particularly advantageous, since an electrical connection between a shelf assembly and the vending machine would be repeatedly stressed and worn during the sliding and tilting of the shelf assembly while the shelf assembly is being loaded or serviced.

Now the operation of the vending machine as it relates to the first, second and third sensors 91, 92, and 93 will be explained. Before a vending machine is used it must be set up or initialized. A service person will open the vending machine's cabinet 12, and inspect or adjust the vertical spacing between the shelf assemblies 1 and the horizontal spacing between the dividers 3 of each shelf assembly 1. The vertical spacings of the shelf assemblies 1 and the horizontal spacings between the dividers 3 of each shelf assembly 1 will be set to dimensions which are suitable for vending a combination of beverage containers which have been determined as suitable to the vending machine's location. For example, the vending machine may be set up to vend sixty percent twelve ounce cans, thirty percent sixteen ounce plastic containers, and ten percent one liter plastic containers.

After dimensional spacings for the shelf assemblies have been established, the service person slides out and tilts one of the shelf assemblies. Next, beverage containers to be vended are loaded between the dividers 3 of the titled shelf assembly 1. After the shelf assembly 1 has been loaded, it is lifted and horizontally slid back inside the cabinet 12 of the vending machine. The same procedure is repeated for the remaining shelf assemblies 1 of the vending machine.

Once the vending machine has been loaded, the service person uses an input device to program the master controller. The input device could be a customer's selection key pad, provided on the exterior of the vending machine, or it could be a separate dedicate keypad inside the vending machine. The service person programs information into the master controller such as the number of shelf assemblies 1 in the cabinet 12, the spacings between the shelf assemblies 1, the locations or ordering of the shelf assemblies 1 in the cabinet 12, the types of beverage containers to be vended, the prices of the beverage containers to be vended, and/or other similar data.

After the master controller has been programmed, an access door to the vending machine is closed and locked. The closing of the door, is sensed by the master controller. Once the door is closed, the master controller signals the elevator drive system 50 to sweep the elevator carrying platform 70 from one end of the elevator shaft 16 to the other end.

During this sweep, the second sensor 92 senses the second indicators 94 of each shelf assembly 1, The sensed second indicators 94 are processed by the master controller in order to verify that the information programmed by the service person, concerning such parameters as the shelf assembly count and locations, is indeed correct.

Alternatively, the service person need not program the master controller with details concerning the shelf assembly count and locations. Instead, the master controller can initially receive and store this data based upon the signals received from the second sensor 92 during the sweep of the elevator carrying platform 70.

After the vending machine has been set up or initialized, the elevator carrying platform 70 is elevated toward the top of the elevator shaft 16. Once the first sensor 91 senses the first decal, located near the topmost portion of the elevator shaft 16, the elevator drive system 50 causes the elevator carrying platform 70 to stop. The elevator carrying platform 70 stays parked at the topmost position of the elevator shaft 16, in a so-called "wait state" while the vending machine awaits a customer.

By keeping the elevator carrying platform 70 parked at the topmost portion of the elevator shaft 16, the elevator shaft remains unencumbered, so that cool air may freely pass through the elevator shaft 16 to the beverage containers disposed on the shelf assemblies 1. This arrangement is particularly advantageous when the vending machine is to vend cold beverage containers. After each vend cycle, the elevator carrying platform 70 is again parked at the topmost portion of the elevator shaft 16, in order to maintain an unencumbered elevator shaft 16.

The vending machine remains in the wait state, with the elevator carrying platform 70 parked, until a wake-up signal is generated by the master controller. The master controller generates the wake-up signal in response to a first coin, token, bill, card, or other form of payment, being received in the vending machine. Once a customer inserts the first coin, or other form of payment, the master controller's wake-up signal is transmitted to the elevator drive system 50.

The elevator drive system 50 causes the elevator carrying platform 70 to move vertically downward until the first sensor 91 senses the third decal located adjacent the delivery port 100. Once the third decal is sensed the elevator is parked adjacent the third decal. The third decal is adjacent the delivery port 100 which is located midway along the elevator shaft 16. Therefore, the elevator carrying platform 70 will be parked midway along the elevator shaft 16, when positioned adjacent the third decal. By positioning the elevator carrying platform 70 midway, the vending time is reduced since the elevator carrying platform 70 will be optimally located to reduce its travel time to a random shelf assembly 1.

Once the customer has finished inserting payments into the vending machine, the customer enters a selection of the beverage container which is desired. Once the selection has been entered, the master controller, having been programmed, knows which shelf assemblies 1 contain the desired beverage container. Therefore, the master controller sends another signal to the elevator drive system 50 which causes the elevator carrying platform 70 to move to a shelf assembly 1 containing the desired beverage container.

As the elevator carrying platform 70 travels to the desired shelf assembly 1, the second sensor 92 detects the second indicator 94 of each passing shelf assembly 1. The passing shelf assemblies 1 are counted, or otherwise analyzed, to verify and chart the location of the elevator carrying platform 70. During this time, the customer awaiting the vending operation may be entertained, or at least informed, by the vending machine. The entertainment or information could be in the form of musical tones emitted from a speaker of the vending machine. Alternatively, a display of visual images on a screen of the vending machine could occur. Such entertainment or information reassures the customer that the vending machine has accepted the customer's selection and is in the process of vending the selected beverage container. Ultimately, the entertainment or information should continue until the selected beverage container is dispensed to the delivery port 100.

Once the desired shelf assembly's second indicator 94 is sensed by the second sensor 92, the master controller causes the elevator carrying platform 70 to stop. The elevator carrying platform 70 is stopped at a position wherein the slanted portion 72 of the elevator carrying platform 70 is slightly above a dispensing location of the escapement block 4 of the desired shelf assembly 1.

Next, the master controller causes one or more of the solenoid actuator mechanisms 80 to move to the active state, as illustrated in FIG. 17. Finally, the master controller causes the elevator carrying platform 70 to slowly move downward.

During the downward movement, the bumper 83 of each activated, solenoid actuator mechanism 80 contacts a portion of the escapement block 4 of the shelf assembly 1. The contact causes the activation of a portion of the escapement block 4, and ultimately leads to the dispensing of a beverage container onto the slanted portion 73 of the elevator carrying platform 70. The details of the escapement mechanism and its activation will follow in this disclosure.

After the beverage container is dispensed onto the slanted portion 72 of the elevator carrying platform 70, the beverage container rolls or slides onto the conveyor 73. Next, the elevator drive system 50 causes the elevator carrying platform 70, with the dispensed beverage container C, to move vertically until the first sensor 91 senses the third decal located adjacent the delivery mechanism 200. Upon sensing the third decal, the master controller causes the conveyor 73 to dispense the beverage container thereon to the delivery mechanism 200, such that the beverage container is dispensed to the delivery port 100, as discussed above.

Once the beverage container has been dispensed, the master controller activates the elevator drive system 50 to cause the elevator carrying platform 70 to sweep the elevator shaft 16. During this sweep, the third sensor 93 senses the presence or absence of the third indicators 95 associated with each shelf assembly 1. The sensed presence of a third indicator 95 indicates that beverage containers associated with the out-of-stock mechanism are in-stock. The sensed absence of the third indicator 95 indicates that beverage containers associated with the out-of-stock mechanism are out-of-stock.

The master controller receives the signals from the third sensor 93 and uses the received signals to analyze the entire status of the vending machine's stock. For example, simply because one shelf may be out of stock of its particular beverage container, does not mean that the entire vending machine is out of stock of that particular beverage container, since other shelf assemblies 1 may also contain the same particular beverage container. Once all the shelf assemblies containing a particular beverage container are out-of-stock, as indicated by the their respective third indicators, the master controller of the vending machine causes an out-of-stock indication to appear on the exterior of the vending machine to alert customers.

As an alternative to sweeping the elevator carrying platform 70 after each vend cycle, the master controller may sweep the elevator carrying platform 70 after a predetermined number of vend cycles. The predetermined number of vending cycles is advantageously related to the number of beverage containers which remain in escrow after the out-of-stock indication is given by the out-of-stock mechanism.

FIGS. 3 and 4 illustrated the escapement block 4 in structural relation to the shelf pan 2. Each shelf assembly 1 includes an escapement block 4 which extends along the right side edge of the shelf assembly 1, closest to the elevator shaft 16. Each escapement block 4 contains four escapement mechanisms 109. Now, the specific details of the escapement mechanism 109 will be described with reference to FIGS. 21–34.

Figure 21:
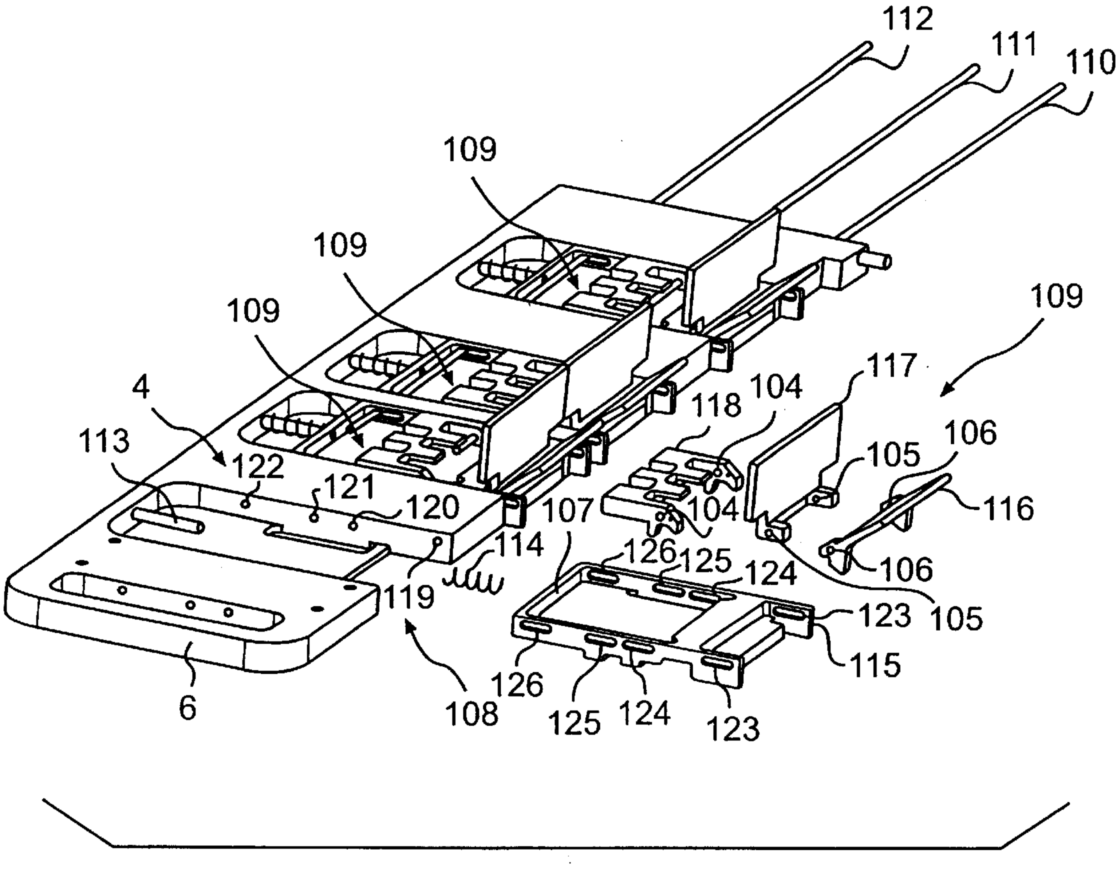
FIG. 21 is a right side perspective view of an escapement block having an escapement mechanism illustrated in exploded form.
Figure 22:
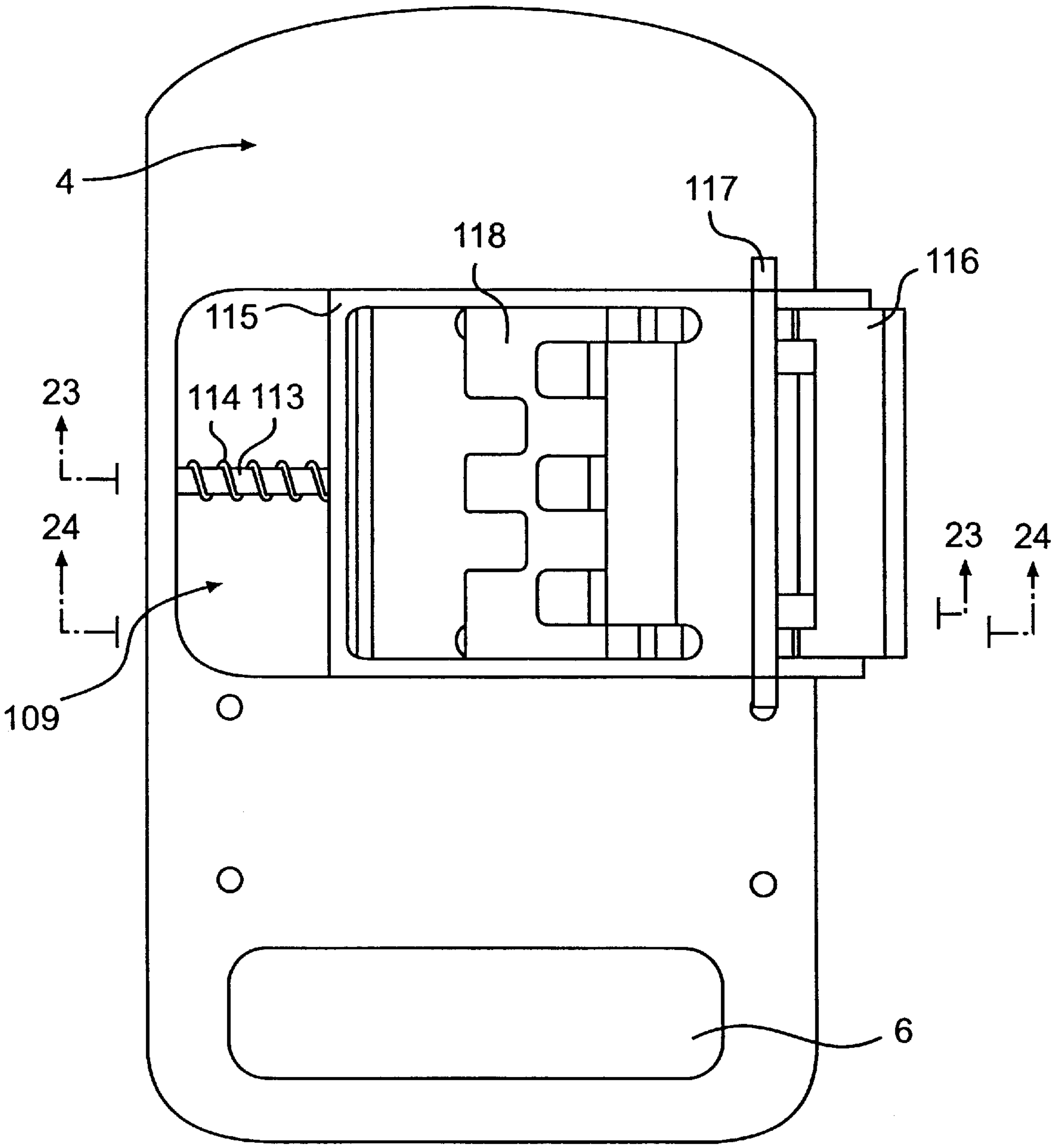
FIG. 22 is an overhead view of one of the escapement mechanisms of the escapement block.

FIG. 21 shows the escapement block 4 with one of the escapement mechanisms 109 in an exploded view. FIG. 22 shows an overhead view of the escapement mechanism 109. Each escapement mechanism 109 includes a slide 115 which reciprocally slides within a cutout portion 108 formed in the escapement block 4. The reciprocal sliding of the slide 115 is guided by a first guide pin 113 which engages in a first guide hole 107 of the slide 115. The slide 115 is normally biased away from the shelf assembly 1 toward the elevator shaft 16 by a guide spring 114.

The slide 115 includes four sets of elongated slots. A first set of elongated slots 123 is formed near the rightmost edge of the slide 115. Second and third sets of elongated slots 124 and 125 are formed in the midsection of the slide 115. A fourth set of elongated slots 126 is formed near a leftmost edge of the slide 115.

An actuation extension 116 is pivotally mounted within the slide 115. The actuation extension 116 includes two pivot guides 106. A second guide pin 110 passes through a first guide hole 119 formed in the escapement block 4, through the first set of elongated slots 123 of the slide 115, and through the two pivot guides 106 of the actuation extension 116. The second guide pin 110 is in the form of an elongated rod which extends approximately the entire length of the escapement block 4.

A first gate 117 is also pivotally mounted within the slide 115. The first gate 117 includes two pivot guides 105. The second guide pin 110 also passes through the two pivot guides 105 of the first gate 117.

A second gate 118 is also pivotally mounted within the slide 115. The second gate 118 includes two pivot guides 104. A third guide pin 111 passes through a second guide hole 120 formed in the escapement block 4, through the second set of elongated slots 124 of the slide 115, and through the two pivot guides 104 of the second gate 118. The third guide pin 111 is in the form of an elongated rod which extends approximately the entire length of the escapement block 4.

A fourth guide pin 112 passes through a third guide hole 122 formed in the escapement block 4 and through the fourth set of elongated slots 126 of the slide 115. The fourth guide pin 112 is in the form of an elongated rod which extends approximately the entire length of the escapement block 4. A fourth guide hole 121 of the escapement block will be described later, in conjunction with the third set of slots 125 of the slide 115.

Figure 23:
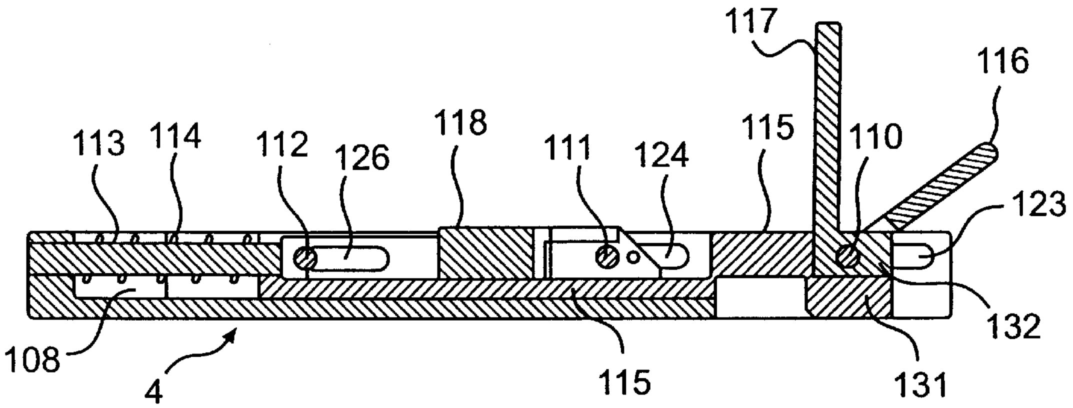
FIG. 23 is a cross sectional view taken along line 23—23 of FIG. 22.
Figure 24:
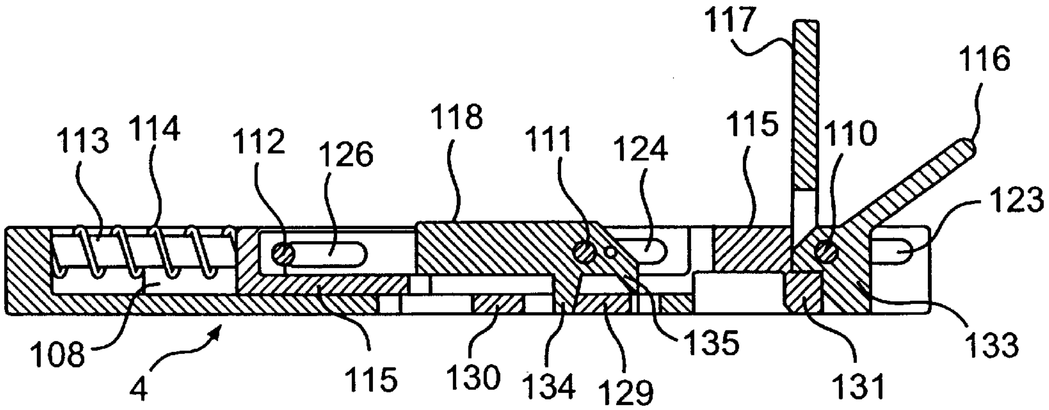
FIG. 24 is a cross sectional view taken along line 24—24 of FIG. 22.

FIGS. 23 and 24 are cross sectional views of the escapement mechanism 109 illustrating the slide 115 resting upon the cutout portion 108 of the escapement block 4. FIGS. 23 and 24 illustrate the slide 115 when it is slid to a rightmost position under the biasing force of the spring 114.

As can be seen in FIG. 23, the slide 115 includes a lower abutment 131 near the rightmost edge of the slide 115. The lower abutment 131 engages a lower portion 132 of the first gate 117. The contact between the lower abutment 131 and the lower portion of the first gate 117 causes the first gate 117 to assume a perpendicular relation to the slide 115.

As can be seen in FIG. 24, an inner portion of the lower abutment 131 engages an extension 133 of the actuation extension 116. The contact between the lower abutment 131 and the extension 133 of the actuation extension 116 causes the actuation extension 116 to assume an angular disposition relative to the slide 115. The actuation extension 116 extends at approximately a forty-five degree angle away from the slide 115, and extends beyond the rightmost edge of the slide 115.

As can also be seen in FIG. 24, the slide 115 includes a first tab 129 and a second tab 130. The second gate 118 includes a first lever 134 and a second lever 135. A right edge of the first lever 134 is engaged against a left edge of the first tab 129.

Figure 25:
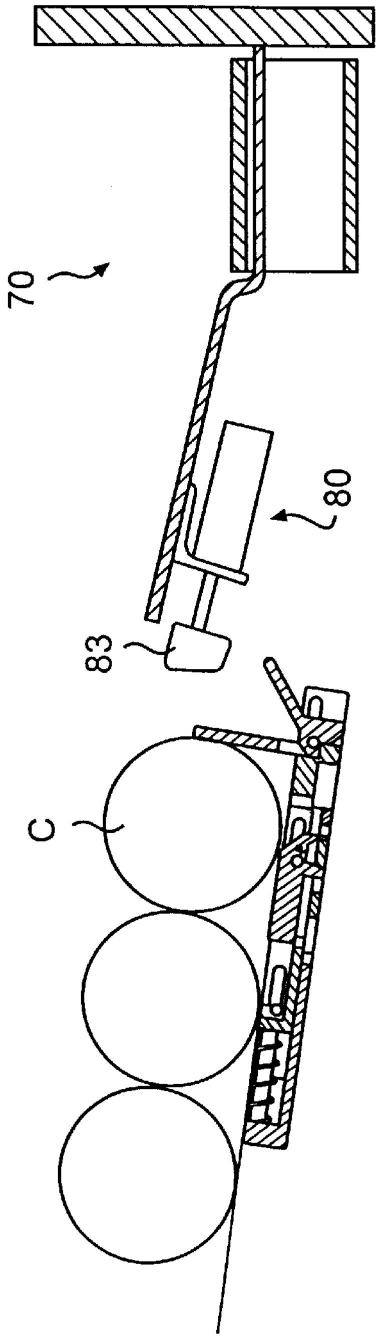
FIG. 25 is the same cross sectional view as FIG. 24, with the inclusion of beverage containers and the elevator carrying platform.
Figure 26:
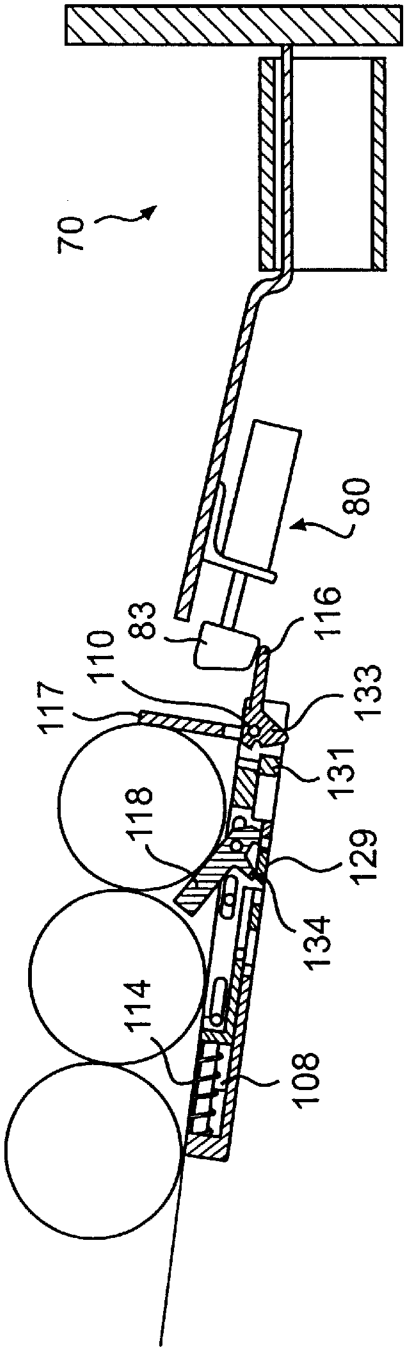
FIG. 26 is the same cross sectional view as FIG. 25, illustrating the escapement mechanism just prior to dispensing a beverage container.
Figure 27:
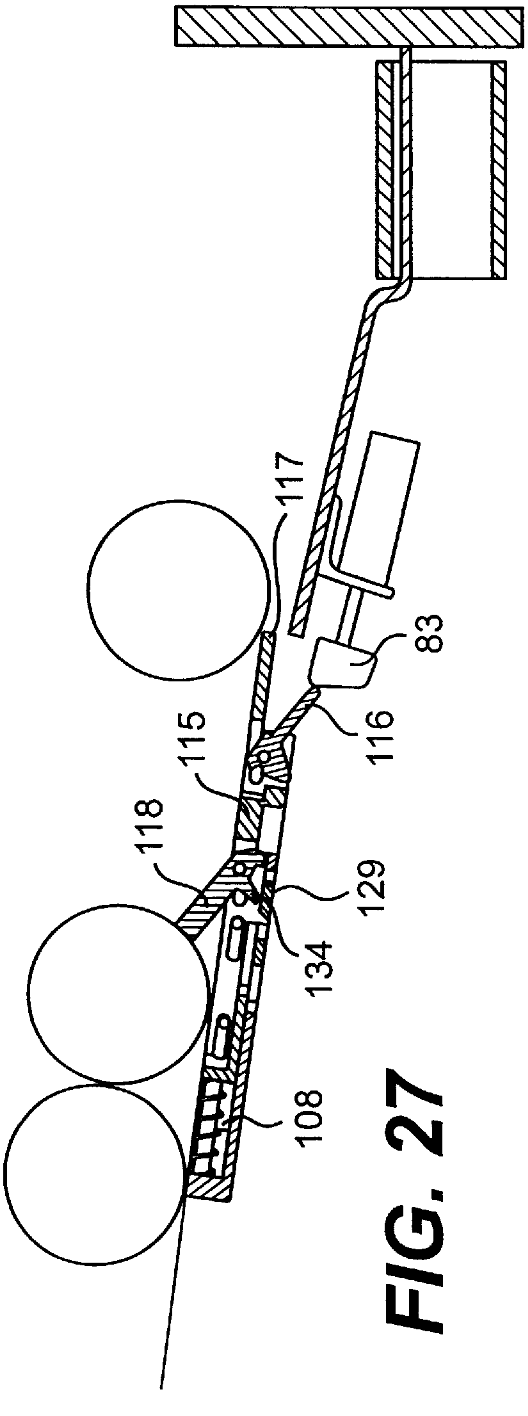
FIG. 27 is the same cross sectional view as FIG. 25, illustrating the escapement mechanism during dispensing of the beverage container.
Figure 28:
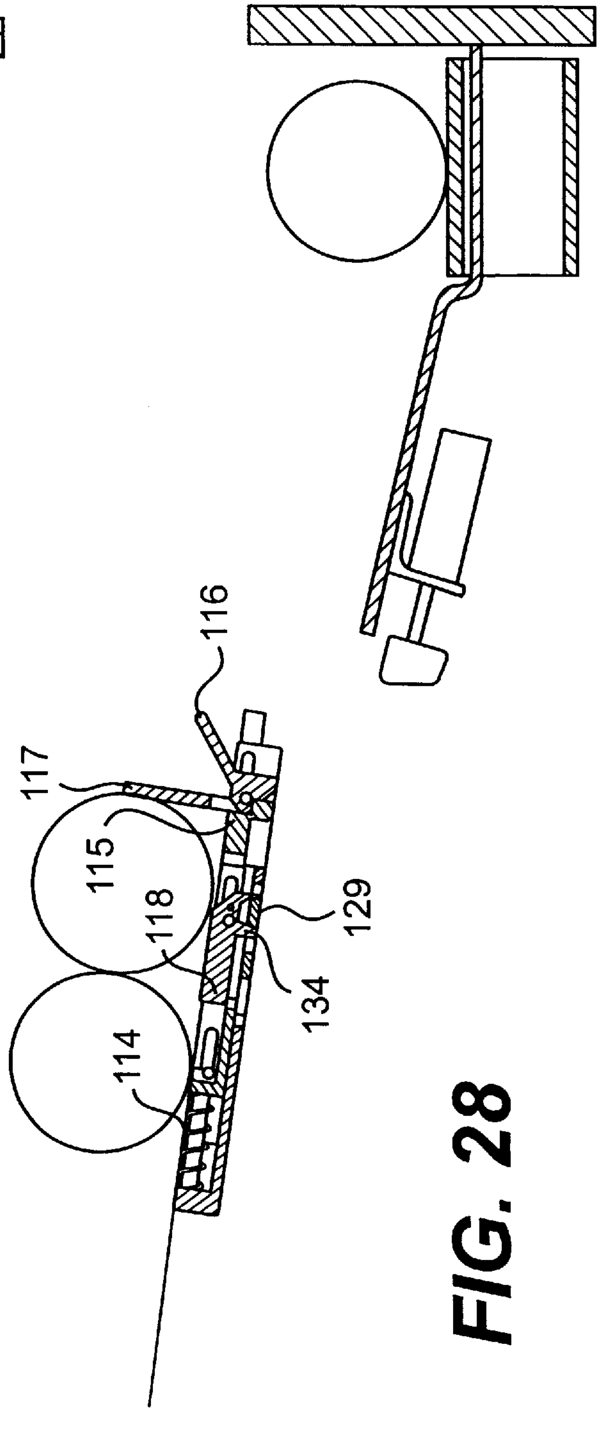
FIG. 28 is the same cross sectional view as FIG. 25, illustrating the escapement mechanism after dispensing the beverage container.

Now, the operation of the escapement mechanism will be explained making reference to FIGS. 25 through 32. FIG. 25 is identical to the cross sectional view of FIG. 24, except for the presence of the beverage containers C and elevator carrying platform 70. FIGS. 26–28 are similar to the cross sectional views of FIGS. 24 and 25, but illustrate the escapement mechanism 109 in various progressive stages during the dispensing of a beverage container C onto the elevator carrying platform 70.

Figure 29:
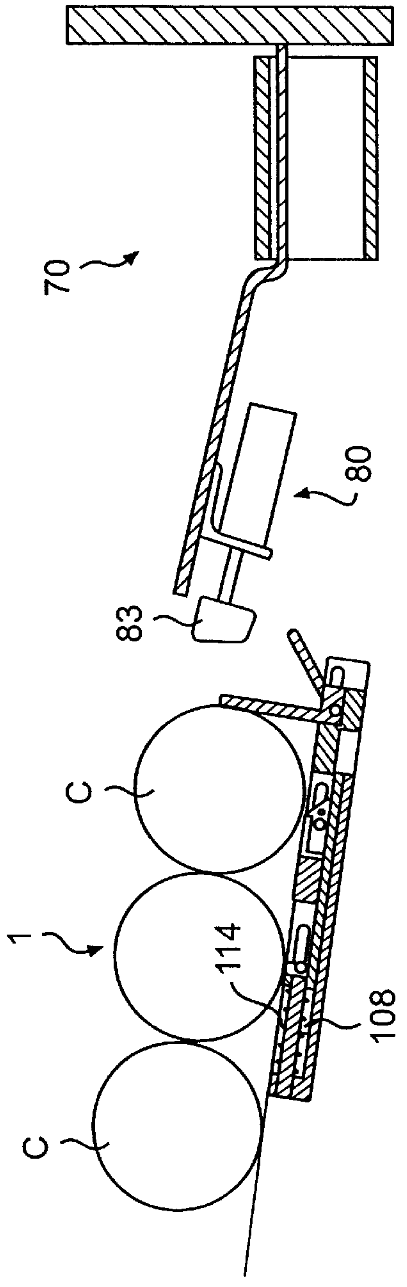
FIG. 29 is the same cross sectional view as FIG. 23, with the inclusion of beverage containers and the elevator carrying platform.
Figure 30:
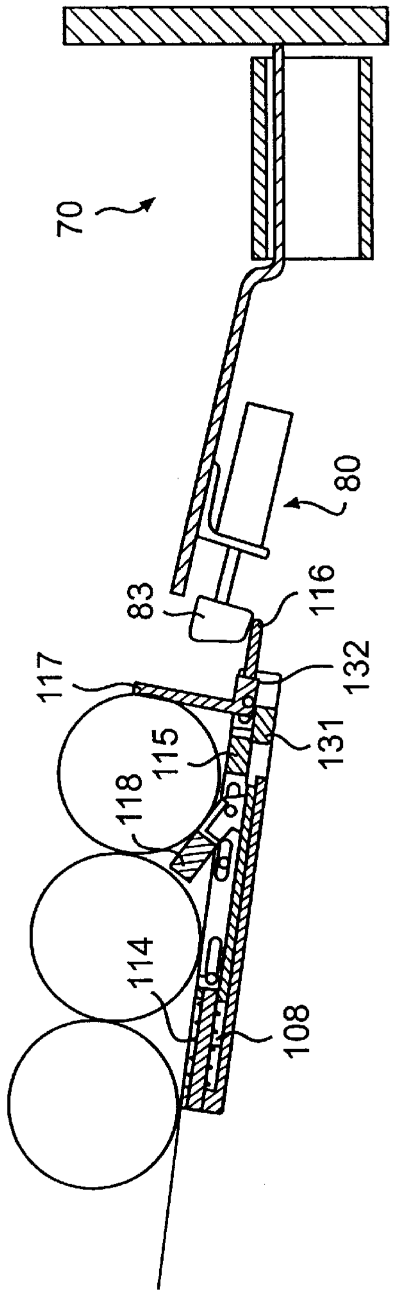
FIG. 30 is the same cross sectional view as FIG. 29, illustrating the escapement mechanism just prior to dispensing the beverage container.
Figure 31:
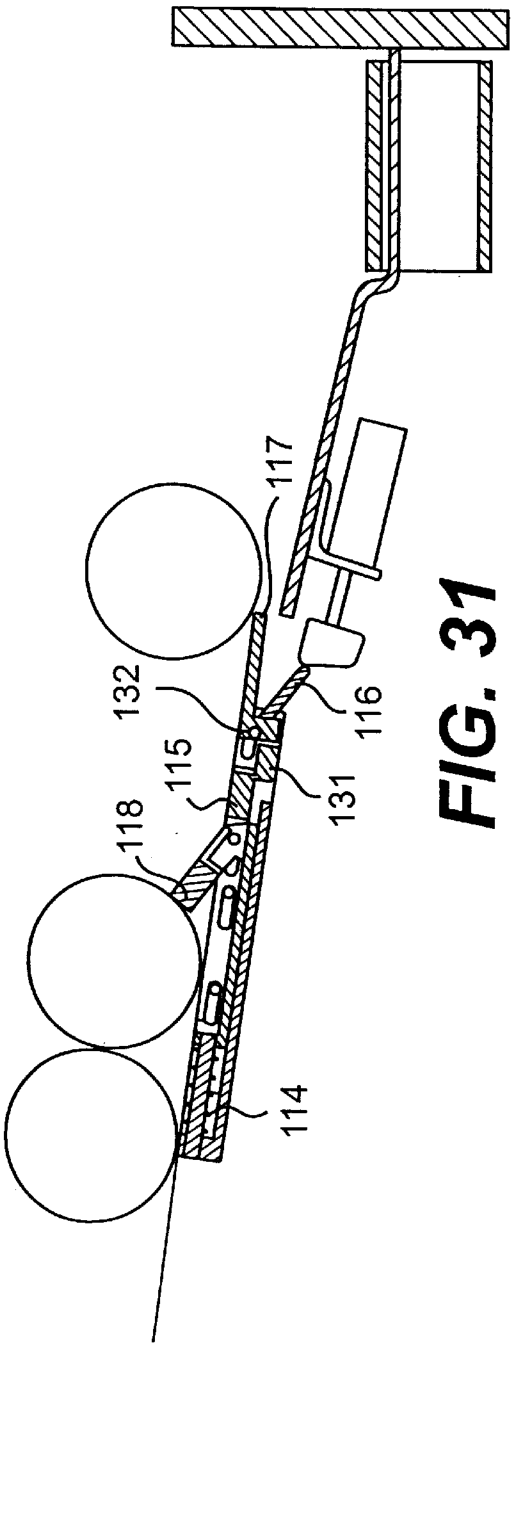
FIG. 31 is the same cross sectional view as FIG. 29, illustrating the escapement mechanism during dispensing of the beverage container.
Figure 32:
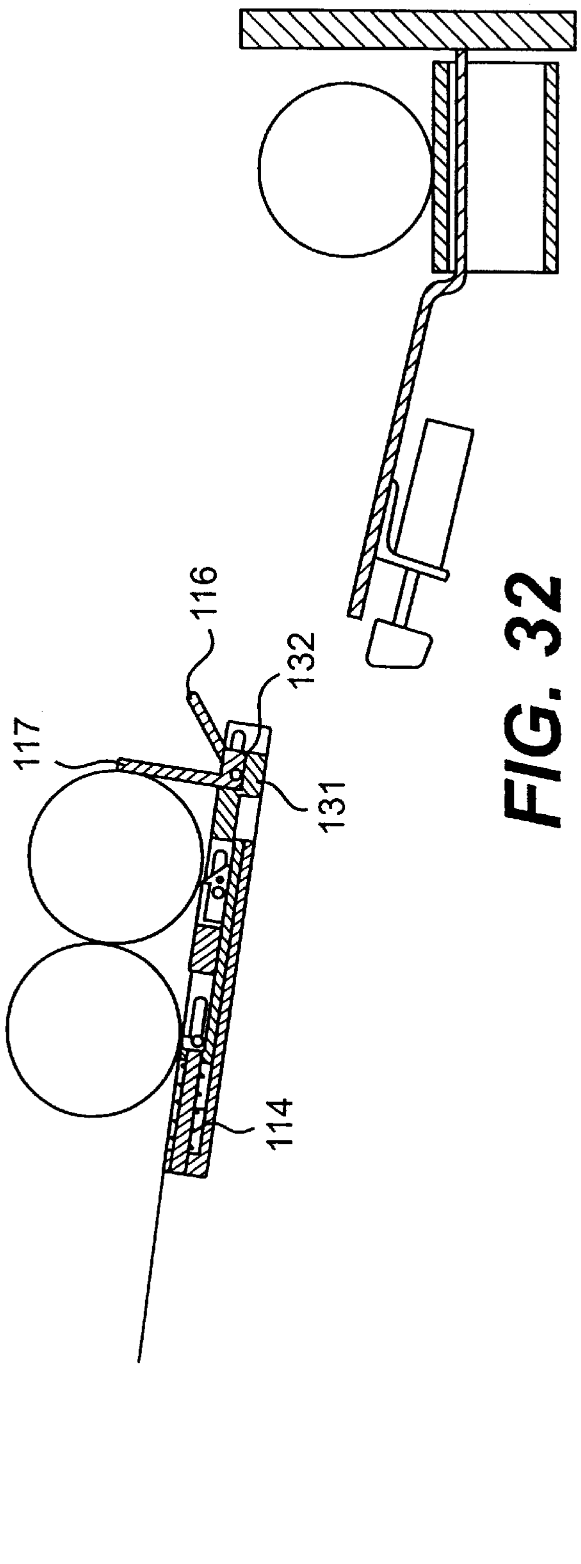
FIG. 32 is the same cross sectional view as FIG. 29, illustrating the escapement mechanism after dispensing the beverage container.

FIG. 29 is identical to the cross sectional view of FIG. 23, except for the presence of the beverage containers C and elevator carrying platform 70. FIGS. 30–32 are similar to the cross sectional views of FIGS. 23 and 29, but illustrate the escapement mechanism 109 in various progressive stages during the dispensing of a beverage container C onto the elevator carrying platform 70.

FIGS. 25 and 29 show the elevator carrying platform 70 located in a position which is slightly elevated relative to the shelf assembly 1. The actuator mechanism 80 has been placed in its active state by the master controller. The active state is characterized by the extended bumper 83.

FIGS. 26 and 30 show the elevator carrying platform 70 after it has been slightly vertically lowered. The bumper 83 of the actuator mechanism 80 has contacted the actuation extension 116 of the escapement mechanism 109. The actuation extension 116 has pivoted about the second guide pin 110 until it now lies parallel to the slide 115. The pivoting motion has caused the extension 133 of actuation extension 116 to push the lower abutment 131 of the slide 115. Pushing the lower abutment 131 caused the slide 115 to slide leftward into the cutout portion 108 against the biasing force of the guide spring 114. As illustrated in FIG. 30, the leftward motion of the slide 115 has also caused the portion of the lower abutment 131 for supporting the lower portion 132 of the first gate 117 to partially slide out from under the lower portion 132 of the first gate 117.

Also of importance in FIG. 26 is the interaction between the first lever 134 of the second gate 118 and the first tab 129 of slide 115. As the slide moves to the left, the left edge of first tab 129 presses against the right edge of the first lever 134. The pressure causes the second gate 118 to rise up from the slide 115. The second gate 118 acts to block a following beverage container C when elevated from the slide 115. FIGS. 27 and 31 illustrate the last instant of contact between the bumper 83 of the actuator mechanism 80 and the actuation extension 116. At this instant, the slide 115 is slid to its leftmost extent within the cutout portion 108 of the escapement block 4. As illustrated in FIG. 31, the portion of the lower abutment 131 for supporting the lower portion 132 of the first gate 117 has completely slid out from under the lower portion 132 of the first gate 117. Since, the first gate 117 is not longer supported, the first gate 117 will fall clockwise under the influence of the weight of the beverage container C which rests thereagainst.

Also of importance in FIG. 27 is the interaction between the between the first lever 134 of the second gate 118 and the first tab 129 of the slide 115. The first lever has now past out of contact with the left edge of the first tab 129 and assumed an position on an upper surface of the first tab 129. In this position, the second gate 118 is locked against rotation. Therefore, the second gate acts to hold the weight of the beverage containers C, so that only one beverage container is dispensed by the fallen first gate 117.

FIGS. 28 and 32 illustrate the escapement mechanism 109 after elevator carrying platform 70 has past by, and the dispensing operation has finished. Once the bumper 83 no longer contacts the actuation extension 116, the slide 115 quickly slides to the right under the influence of the guide spring 114. When the slide 115 has assumed its rightmost position in the cutout portion 108 of the escapement block 4, the lower abutment 131 will once again support the lower portion 132 of the first gate 117. With the lower first gate 117 supported in its perpendicular orientation, beverage containers are retained by the escapement mechanism 109. Further, since the slide 115 has assumed its rightmost position, the first tab 129 no longer supports the first lever 134 of the second gate 118. The first lever 134 reassumes a position of abutment against the left edge of the first tab 129. Also, as the slide 115 moves toward its rightmost position, the right edge of the first tab 129 pushes against the left edge of the second lever 135. The contact between the first tab 129 and the second lever 135 assures that the second gate 118 will again lie flat and parallel to the upper surface of the slide 115, such that beverage containers C may roll over the second gate 118 and come to rest against the first gate 117.

It should be noted that the dispensing operation described above has several advantageous. First, the elevator carrying platform 70 need not be precisely located beside a shelf assembly before the actuator mechanism 80 is activated. By the present invention, the elevator carrying platform can be located anywhere within a tolerance zone above, or below, the shelf assembly prior to actuation of the actuator mechanism 80. This is because the escapement mechanism 109 dispenses in response to the passing of the bumper 83, rather than dispenses in response to a linear pressing by the bumper 83.

Since the elevator need not be precisely located immediately adjacent to the shelf assembly in order to activate the escapement mechanism 109, the drive components of the elevator system need not be expensive and complex. For example, if precise placement were required, the drive source would most likely be a stepper motor, however, the present invention performs using a simple DC motor. Further, if precise location were critical, the drive cables 54A, 54B, 55A, and 55B and bearing cables 59, 60 would have to be immune to stretching, however, the present invention will tolerate low levels of stretch or give in the drive and bearing cables.

Figure 33:
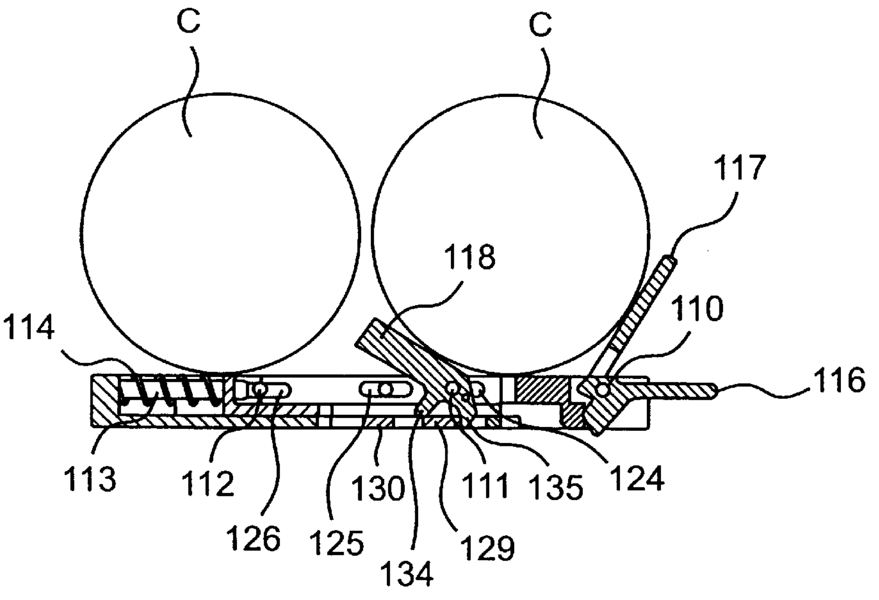
FIG. 33 is the same cross sectional view as FIG. 26, illustrating an adjustable second gate in a small container position.
Figure 34:
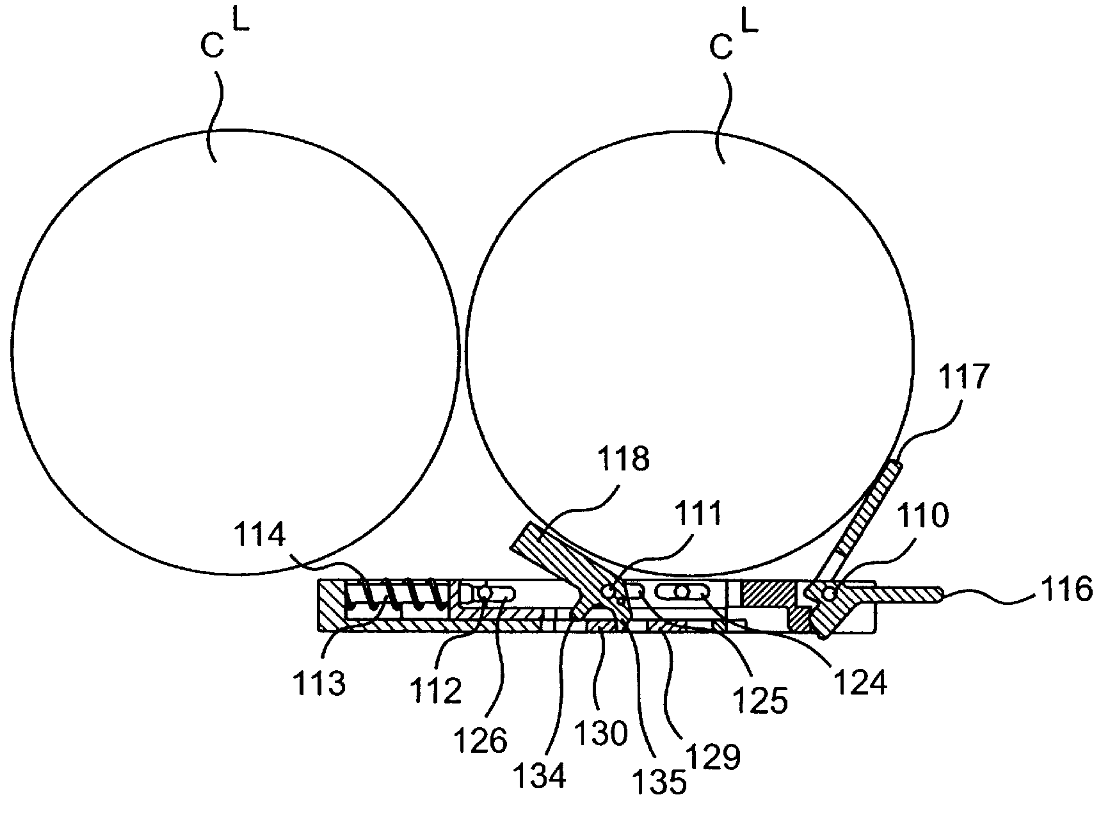
FIG. 34 is the same cross sectional view as FIG. 33, illustrating the adjustable second gate in a large container position.

FIGS. 33 and 34 illustrate an adjustable feature of the second gate 118. The second gate 118 can be pivotally attached to the slide 115 in one of two locations. The two locations allow the escapement mechanism 109 to dispense beverage containers C having a range of diameters (eg. 2 to 3.75 inches).

FIG. 33 illustrates the second gate 118 in a first location which is best suited for dispensing smaller beverage containers C. FIGS. 23–32, as described above, illustrated the connections and functioning of the second gate 118 when located in the first position.

FIG. 34 illustrates the second gate 118 in a second location which is best suited for dispensing larger diameter beverage containers $C^L$. When the second gate 118 is in the second location, the third guide pin 111 is removed from the second guide hole 120 formed in the escapement block 4, and is inserted into the third guide hole 121 formed in the escapement block 4. The third guide pin 111 passes through the third guide hole 121, through the third set of elongated slots 125 of the slide 115, and through the two pivot guides 104 of the second gate 118.

The second gate 118 operates in the same manner as described in relation to FIGS. 23–32 above, except that the first lever 134 is now manipulated by the second tab 130 of the slide 115, instead of the first tab 129. Therefore, the second gate 118 still serves to block the advance of stored beverage containers $C^L$, while a single beverage can $C^L$ is dispensed onto the passing elevator carrying platform 70.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of initializing a vending machine, comprising:

providing a vending machine having a plurality of shelves, an elevator shaft, an elevator vertically movable in the elevator shaft, a sensor attached to the elevator, and a controller in communication with the sensor;

loading items onto the plurality of shelves;

programming the controller;

passing the elevator along an extent of the elevator shaft;

sensing at least one parameter of more than one of the plurality of shelves using the sensor;

communicating the sensed parameters from the sensor to the controller; and determining at least one of a number and a location of the plurality of shelves.

2. The method according to claim 1, wherein the determining step comprises inputting data to indicate which types of items are on which shelves.

3. The method according to claim 1, further comprising:

adjusting a vertical spacing between the plurality of shelves prior to loading the items onto the plurality of shelves.

4. The method according to claim 1, further comprising:

providing a door to close access to an interior of the vending machine; and closing the door after said step of loading items onto the plurality of shelves, wherein the step of passing the elevator along the extent of the elevator shaft is begun after the step of closing the door.

5. The method according to claim 1, wherein the programming step comprises inputting a shelf count corresponding to a number of the plurality of shelves.

6. The method according to claim 1, wherein the determining step comprises analyzing the sensed parameters to arrive at a sensed count corresponding to a number of the plurality of shelves.

7. The method according to claim 6, wherein the programming step comprises inputting a shelf count corresponding to a number of the plurality of shelves.

8. The method according to claim 7, wherein the determining step further comprises verifying that the shelf count is equal to the sensed count.

9. A method of initializing a vending machine, comprising:

loading items onto a plurality of shelves of a vending machine;

programming a controller associated with the vending machine;

passing an elevator vertically along an extent of an elevator shaft of the vending machine;

sensor sensing at least one parameter of each of the plurality of shelves with a sensor attached to the elevator before vending said loaded items;

communicating the sensed parameters from the sensor to the controller; and processing the sensed parameters in the controller.

10. The method according to claim 9, wherein the programming step comprises inputting data to indicate which types of items are on which shelves.

11. The method according to claim 9, further comprising:

providing a door to close access to an interior of the vending machine; and closing the door after the step of loading items onto the plurality of shelves, wherein said passing the elevator along the extent of the elevator shaft is begun after said closing the door.

12. The method according to claim 9, wherein the programming step comprises inputting a shelf count corresponding to a number of the plurality of shelves.

13. The method according to claim 9, wherein the processing step comprises analyzing the sensed parameters to arrive at a sensed count corresponding to a number of the plurality of shelves.

14. The method according to claim 13, wherein the programming step comprises inputting a shelf count corresponding to a number of the plurality of shelves, and wherein the processing step further comprises verifying that the shelf count is equal to the sensed count.

15. A method of initializing a vending machine, comprising:

loading items onto a plurality of shelves of a vending machine;

passing an elevator vertically along an extent of an elevator shaft of the vending machine;

sensing at least one of the plurality of shelves and at least one parameter corresponding to said at least one of the plurality of shelves with a sensor attached to the elevator;

communicating the sensed parameters to the controller; and processing the sensed parameters to initialize the vending machine before vending said loaded items.

16. The method according to claim 15, further comprising inputting data to indicate which types of items are on which shelves.

17. The method according to claim 15, further comprising:

providing a door to close access to an interior of the vending machine; and closing the door after the step of loading items onto the plurality of shelves, wherein said passing the elevator along the extent of the elevator shaft is begun after said closing the door.

18. The method according to claim 15, further comprising inputting a shelf count corresponding to a number of the plurality of shelves.

19. The method according to claim 15, wherein the processing step comprises analyzing the sensed parameters to arrive at a sensed count corresponding to a number of the plurality of shelves.

20. The method according to claim 19, further comprising inputting a shelf count corresponding to a number of the plurality of shelves, and wherein said processing step further comprises verifying that the shelf count is equal to the sensed count.

* * * * *

UNITED STATES PATENT AND TRADEMARK OFFICE

CERTIFICATE OF CORRECTION

PATENT NO. : 6,556,889 B2

DATED : April 29, 2003

INVENTOR(S) : Arthur G. Rudick et al.

It is certified that error appears in the above-identified patent and that said Letters Patent is hereby corrected as shown below:

Column 24,
Line 22, before "sensing," delete "sensor".

Signed and Sealed this

First Day of July, 2003

JAMES E. ROGAN
*Director of the United States Patent and Trademark Office*